(12) United States Patent
Hosoya et al.

(10) Patent No.: US 12,713,153 B2
(45) Date of Patent: Aug. 18, 2026

(54) IMAGE CAPTURING DEVICE HAVING EFFICIENT TDI OPERATION AND REDUCED CIRCUIT SIZE

(71) Applicant: HAMAMATSU PHOTONICS K.K., Hamamatsu (JP)

(72) Inventors: Naonori Hosoya, Hamamatsu (JP); Yukinobu Sugiyama, Hamamatsu (JP); Hidetoshi Yoshimura, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 221 days.

(21) Appl. No.: 18/577,773

(22) PCT Filed: Mar. 16, 2022

(86) PCT No.: PCT/JP2022/012018
§ 371 (c)(1),
(2) Date: Jan. 9, 2024

(87) PCT Pub. No.: WO2023/286364
PCT Pub. Date: Jan. 19, 2023

(65) Prior Publication Data

US 2024/0380997 A1 Nov. 14, 2024

(30) Foreign Application Priority Data

Jul. 13, 2021 (JP) ................................ 2021-115676

(51) Int. Cl.
*H04N 25/768* (2023.01)
*H04N 25/30* (2023.01)
(Continued)

(52) U.S. Cl.
CPC ........... *H04N 25/768* (2023.01); *H04N 25/30* (2023.01); *H04N 25/77* (2023.01); *H04N 25/78* (2023.01)

(58) Field of Classification Search
CPC ...... H04N 25/768; H04N 25/30; H04N 25/77; H04N 25/78; H04N 23/30
See application file for complete search history.

(56) References Cited

U.S. PATENT DOCUMENTS 9,077,921 B2 * 7/2015 Hashimoto ............ H04N 25/78
2011/0019044 A1 * 1/2011 Wang .................. H04N 25/711 348/E5.091

(Continued)

FOREIGN PATENT DOCUMENTS

JP H11-088784 A 3/1999
JP 2000-099694 A 4/2000

(Continued)

OTHER PUBLICATIONS

International Preliminary Report on Patentability mailed Jan. 25, 2024 for PCT/JP2022/012018.

(Continued)

*Primary Examiner* — Ahmed A Berhan
(74) *Attorney, Agent, or Firm* — Faegre Drinker Biddle & Reath LLP

(57) ABSTRACT

An imaging device includes: a pixel unit having M (M is an integer of 2 or more) pixel arrays each including N (N is an integer of 2 or more) pixel portions; and M circuit units. Each circuit unit includes: N charge amplifiers; N A/D converters each including an addition processing portion for performing addition processing on voltage signals and a holding portion for holding an addition signal corresponding to an addition state of the addition processing portion; and a switch circuit for switching connection states between the charge amplifiers and the holding portions of the A/D converters. The switch circuit switches the connection state so that the holding portion for holding the addition signal corresponding to the charge signal output from the pixel portion is switched in accordance with the arrangement order of the N pixel portions.

9 Claims, 30 Drawing Sheets

(51) Int. Cl.

| | |
|---|---|
| ***H04N 25/77*** | (2023.01) |
| ***H04N 25/78*** | (2023.01) |

(56) References Cited

U.S. PATENT DOCUMENTS

| | | | |
|---|---|---|---|
| 2017/0310915 | A1 | 10/2017 | Nitta et al. |
| 2019/0378288 | A1 | 12/2019 | Kobayashi et al. |

FOREIGN PATENT DOCUMENTS

| | | | |
|---|---|---|---|
| JP | 2012-120153 | A | 6/2012 |
| JP | 2016-213710 | A | 12/2016 |
| JP | 2019-158663 | A | 9/2019 |
| JP | 2020-143922 | A | 9/2020 |
| TW | 201117611 | A | 5/2011 |

OTHER PUBLICATIONS

Extended European Search Report issued on Feb. 14, 2025 in corresponding European patent application 22841714.3 (12 pages).

* cited by examiner

40
SW4
SW3
SW2
SW1
42d
42c
42b
42a
SU4(41)
SU3(41)
SU2(41)
SU1(41)
SU4_OUT (MR4)
SU3_OUT (MR3)
SU2_OUT (MR2)
SU1_OUT (MR1)
CA4:32c
CA3:32c
CA2:32c
CA1:32c

T1
T2
T3
T4
T5
T6
T7
T8
T9
RS_A
CA1
CA2
CA3
CA4
SW1
SW2
SW3
SW4
SETN1
SETS1
SETN2
SETS2
RS_M
AD1
AD2
AD3
AD4

| | MEMORY UNIT MU1 | MEMORY UNIT MU2 | MEMORY UNIT MU3 | MEMORY UNIT MU4 | A/D CONVERTER AD1 | A/D CONVERTER AD2 | A/D CONVERTER AD3 | A/D CONVERTER AD4 | READ |
|---|---|---|---|---|---|---|---|---|---|
| T1–T2 | a | | | | | | | | |
| T2–T3 | b | a | | | a | | | | |
| T3–T4 | c | b | a | | 2a | b | | | |
| T4–T5 | d | c | b | a | 3a | 2b | c | | |
| T5–T6 | e | d | c | b | 4a | 3b | 2c | d | |
| T6–T7 | f | e | d | c | e | 4b | 3c | 2d | 4a |
| T7–T8 | g | f | e | d | 2e | f | 4c | 3d | 4b |
| T8–T9 | h | g | f | e | 3e | 2f | g | 4d | 4c |

CA4
SW1
SW2
SW3
SW4
SET
AD1
AD2
AD3
AD4
LS
RS_C1
RS_C2
RS_C3
RS_C4
D1
D2
D3
D4
T1
T2
T3
T4
T5
T6
T7
T8
T9
A/D Convert 40A
SW4
SW3
SW2
SW1
42d
42c
42b
42a
SU4(41)
SU3(41)
SU2(41)
SU1(41)
SU4_OUT
SU3_OUT
SU2_OUT
SU1_OUT
PD4(11)
PD3(11)
PD2(11)
PD1(11)

T1
T2
T3
T4
T5
T6
T7
T8
T9
CA1
CA2
CA3
CA4
SETN1
SETN2
SETN3
SETN4
SETS1
SETS2
SETS3
SETS4
D1
D2
D3
D4

*Fig.25*

| | T1–T2 | T2–T3 | T3–T4 | T4–T5 | T5–T6 | T6–T7 | T7–T8 | T8–T9 |
|---|---|---|---|---|---|---|---|---|
| CHARGE AMPLIFIER CA1 | PD1 | PD2 | PD3 | PD4 | PD1 | PD2 | PD3 | PD4 |
| CHARGE AMPLIFIER CA2 | PD4 | PD1 | PD2 | PD3 | PD4 | PD1 | PD2 | PD3 |
| CHARGE AMPLIFIER CA3 | PD3 | PD4 | PD1 | PD2 | PD3 | PD4 | PD1 | PD2 |
| CHARGE AMPLIFIER CA4 | PD2 | PD3 | PD4 | PD1 | PD2 | PD3 | PD4 | PD1 |
| READ ORDER | CA1 | CA2 | CA3 | CA4 | CA1 | CA2 | CA3 | CA4 |

| | T1–T2 | T2–T3 | T3–T4 | T4–T5 | T5–T6 | T6–T7 | T7–T8 | T8–T9 |
|---|---|---|---|---|---|---|---|---|
| CHARGE AMPLIFIER CA1 | a | 2a | 3a | 4a | e | 2e | 3e | 4e |
| CHARGE AMPLIFIER CA2 | | b | 2b | 3b | 4b | f | 2f | 3f |
| CHARGE AMPLIFIER CA3 | | | c | 2c | 3c | 4c | g | 2g |
| CHARGE AMPLIFIER CA4 | | | | d | 2d | 3d | 4d | h |
| READ | | | | | 4a | 4b | 4c | 4d |

CA4
SW1
SW2
SW3
SW4
SETN1
SETN2
SETN3
SETN4
SETS1
SETS2
SETS3
SETS4
D1
D2
D3
D4
T1
T2
T3
T4
T5
T6
T7
T8
T9

IMAGE CAPTURING DEVICE HAVING EFFICIENT TDI OPERATION AND REDUCED CIRCUIT SIZE

TECHNICAL FIELD

One aspect of the present disclosure relates to an imaging device.

BACKGROUND ART

Some imaging devices perform a TDI (time delay integration) operation in order to improve the S/N ratio. For example, the imaging device described in Patent Literature 1 includes n (n is an integer of 2 or more) light receiving elements arranged in the scanning direction of an optical system and a TDI circuit for time delay integration of pixel signals output from the n light receiving elements. The TDI circuit includes p (p is an integer satisfying p=kn, and k is a positive integer) integration capacitors and a switching circuit network for supplying pixel signals output from the n light receiving elements to the p integration capacitors so that the pixel signals of the same imaging point are supplied to the same integration capacitor.

CITATION LIST

Patent Literature

Patent Literature 1: Japanese Unexamined Patent Publication No. H11-88784

SUMMARY OF INVENTION

Technical Problem

In the imaging device described in Patent Literature 1, when the charge generated in the light receiving element is transferred to the integration capacitor, a capacitance division occurs between the capacitor of the light receiving element and the integration capacitor. In this case, since the charge remains on the light receiving element side, charge transfer may be insufficient. In addition, the imaging device described above is required to suppress an increase in circuit size and reduce the amount of output signal.

Therefore, it is an object of one aspect of the present disclosure to provide an imaging device capable of realizing an efficient TDI operation while suppressing an increase in circuit size and reducing the amount of output signal.

Solution to Problem

An imaging device according to one aspect of the present disclosure includes: a pixel unit having M (M is an integer of 2 or more) pixel arrays each including N (N is an integer of 2 or more) pixel portions that perform photoelectric conversion and are arranged along a first direction, the M pixel arrays being arranged along a second direction perpendicular to the first direction; and M circuit units provided corresponding to the M pixel arrays. Each of the M circuit units includes: N charge amplifiers each of which includes an operational amplifier and a capacitive portion connected between an inverting input terminal and an output terminal of the operational amplifier and which convert charge signals output from the N pixel portions of the corresponding pixel array into voltage signals; N A/D converters (analog-to-digital converters) each including an addition processing portion for performing addition processing on the voltage signals output from any one of the N charge amplifiers and a holding portion for holding an addition signal corresponding to an addition state of the addition processing portion; and a switch circuit for switching connection states between the N charge amplifiers and the holding portions of the N A/D converters. In each of the M circuit units, the switch circuit switches the connection state so that the holding portion for holding the addition signal corresponding to the charge signal output from the pixel portion is switched in accordance with an arrangement order of the N pixel portions along the first direction.

In this imaging device, each of the M circuit units includes N charge amplifiers, N A/D converters, and a switch circuit. Then, in each of the M circuit units, the connection state between the charge amplifier and the holding portion of the A/D converter is switched so that the holding portion of the A/D converter that holds an addition signal corresponding to the charge signal output from the pixel portion is switched in accordance with the arrangement order of the N pixel portions along the first direction. In this manner, the TDI operation is realized. By realizing the TDI operation by such addition processing using the A/D converter, an increase in circuit size can be suppressed as compared with a case where a memory for simply adding signals is provided in the circuit unit, for example. In addition, the amount of output signal can be reduced as compared with a case where signals are output to the outside of the imaging device and addition processing is performed outside, for example. In addition, in this imaging device, the charge signal output from the pixel portion is converted into a voltage signal by the charge amplifier, and the voltage signal is added by the A/D converter. Therefore, since the loss in transferring the charge signal from the pixel portion can be reduced, an efficient TDI operation can be realized. As a result, according to this imaging device, an efficient TDI operation can be realized while suppressing an increase in circuit size and reducing the amount of output signal.

Each of the N A/D converters may be of a single slope type. In this case, it is possible to realize an efficient TDI operation with a simple configuration.

The switch circuit may be connected between the N charge amplifiers and the addition processing portions of the A/D converters. In this case, it is possible to realize an efficient TDI operation with a simple configuration.

The M circuit units may be arranged so as to be adjacent to the corresponding pixel arrays in the first direction. Each of the M circuit units may have N arrangement regions aligned in the second direction, and the charge amplifier and the A/D converter may be arranged in each of the N arrangement regions. A width of each of the N arrangement regions in the second direction may be equal to or less than 1/N of a width of the pixel portion in the second direction. In this case, the circuit units can be arranged efficiently, and an increase in circuit size can be further suppressed.

An imaging device according to one aspect of the present disclosure includes: a pixel unit having M (M is an integer of 2 or more) pixel arrays each including N (N is an integer of 2 or more) pixel portions that perform photoelectric conversion and are arranged along a first direction, the M pixel arrays being arranged along a second direction perpendicular to the first direction; and M circuit units provided corresponding to the M pixel arrays. Each of the M circuit units includes: N charge amplifiers each of which includes an operational amplifier and a capacitive portion, which is connected between an inverting input terminal and an output terminal of the operational amplifier and in which a charge signal output from any one of the N pixel portions of the corresponding pixel array is accumulated, and which convert the charge signal into a voltage signal; and a switch circuit for switching connection states between the N pixel portions and the capacitive portions of the N charge amplifiers. In each of the M circuit units, the switch circuit switches the connection state so that the capacitive portion in which the charge signal output from the pixel portion is accumulated is switched in accordance with an arrangement order of the N pixel portions along the first direction.

In this imaging device, each of the M circuit units includes N charge amplifiers and a switch circuit. Then, in each of the M circuit units, the connection state between the pixel portion and the charge amplifier is switched so that the capacitive portion of the charge amplifier in which the charge signal output from the pixel portion is accumulated (added) is switched in accordance with the arrangement order of the N pixel portions along the first direction. In this manner, the TDI operation is realized. By realizing the TDI operation by such addition processing using the charge amplifier, an increase in circuit size can be suppressed as compared with a case where a memory for simply adding signals is provided in the circuit unit, for example. In addition, the amount of output signal can be reduced as compared with a case where signals are output to the outside of the imaging device and addition processing is performed outside, for example. In addition, in this imaging device, the charge signal output from the pixel portion is accumulated in the capacitive portion of the charge amplifier, added, and converted into a voltage signal by the charge amplifier. Therefore, since the loss in transferring the charge signal from the pixel portion can be reduced, an efficient TDI operation can be realized. As a result, according to the imaging device, an efficient TDI operation can be realized while suppressing an increase in circuit size and reducing the amount of output signal.

The M circuit units may be arranged so as to be adjacent to the corresponding pixel arrays in the first direction. Each of the M circuit units may have N arrangement regions aligned in the second direction, and the charge amplifier may be arranged in each of the N arrangement regions. A width of each of the N arrangement regions in the second direction may be equal to or less than 1/N of a width of the pixel portion in the second direction. In this case, the circuit units can be arranged efficiently, and an increase in circuit size can be further suppressed. Each of the N pixel portions may include a surface type photodiode. In this case, the area of the pixel portion can be increased.

Each of the N pixel portions may include an embedded photodiode. In this case, it is possible to achieve high sensitivity and low noise.

N may be an integer of 8 or more. When the number of pixels is large like this, an increase in circuit size or an increase in the amount of output signal is likely to become a problem. However, even in such a case, the imaging device can realize an efficient TDI operation while suppressing an increase in circuit size and reducing the amount of output signal.

Advantageous Effects of Invention

According to one aspect of the present disclosure, it is possible to provide an imaging device capable of realizing an efficient TDI operation while suppressing an increase in circuit size and reducing the amount of output signal.

BRIEF DESCRIPTION OF DRAWINGS

FIG. 11 is a diagram for explaining a TDI operation.

FIG. 25 is a timing chart showing the operation of the imaging device according to the third modification example.

FIG. 27 is a diagram for explaining a TDI operation in the third modification example.

DESCRIPTION OF EMBODIMENTS

Figure 1:
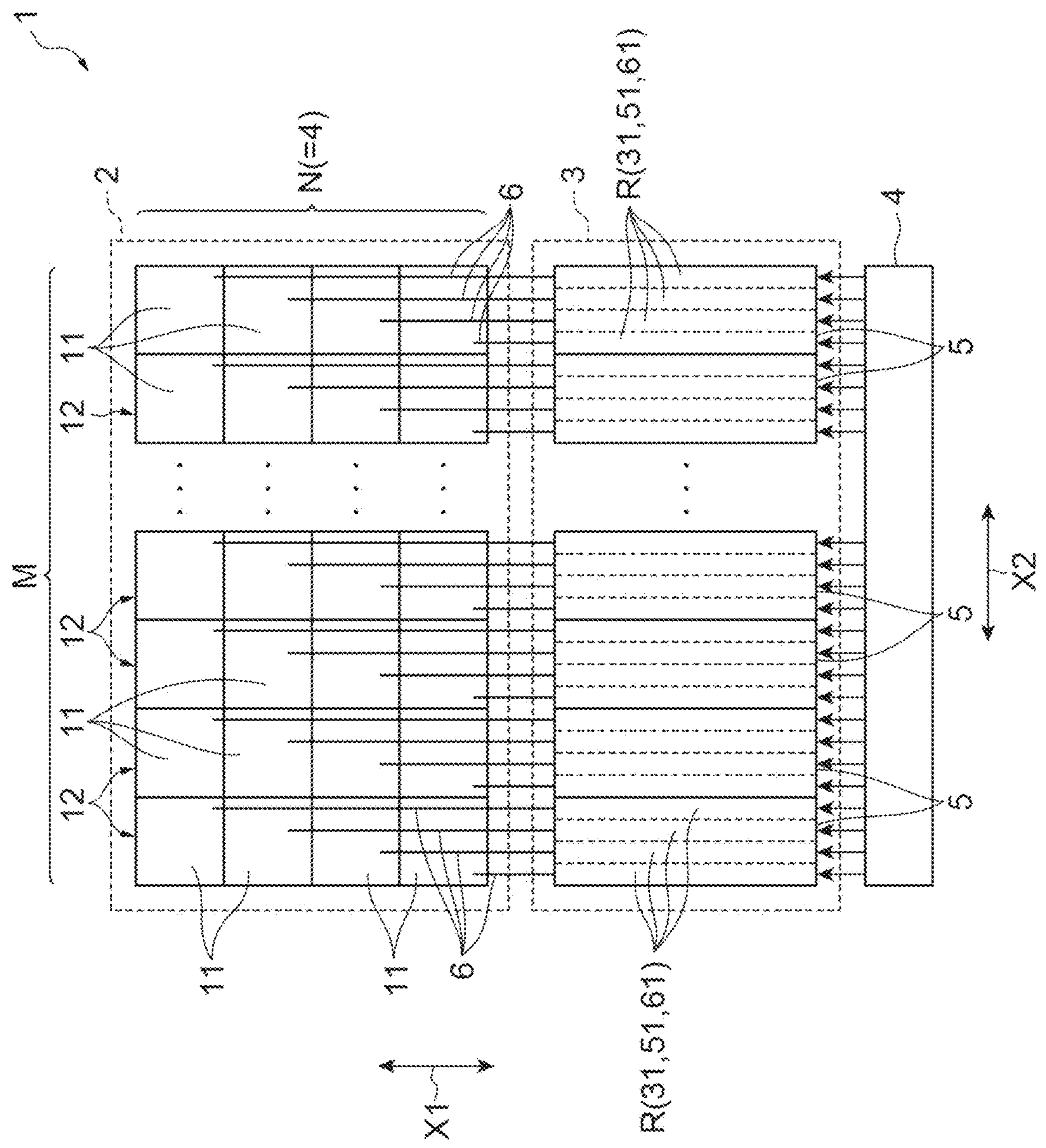
FIG. 1 is a plan view of an imaging device according to an embodiment.

Hereinafter, embodiments of the present disclosure will be described in detail with reference to the diagrams. In the following description, the same or equivalent elements are denoted by the same reference numerals, and repeated description thereof will be omitted.

[Configuration of Imaging Device]

An imaging device 1 shown in FIG. 1 is, for example, a solid-state imaging device used in an X-ray image acquisition apparatus for acquiring an X-ray image of an object transported along the transport direction. In the X-ray image acquisition apparatus, for example, X-rays transmitted through the object are converted into scintillation light by a scintillator and the scintillation light is detected by the imaging device 1, thereby acquiring an X-ray image of the object. At this time, in order to improve the S/N ratio in the acquired image, a TDI (time delay integration) operation using the imaging device 1 is performed. The TDI operation will be described later.

As shown in FIG. 1, the imaging device 1 includes a pixel unit 2, a circuit section 3, and a decoder 4. The pixel unit 2, the circuit section 3, and the decoder 4 are integrally formed on one chip. The pixel unit 2 has M (M is an integer of 2 or more) pixel arrays 12 each including N (N is an integer of 2 or more) pixel portions 11 that perform photoelectric conversion. Each pixel portion 11 is formed, for example, in a rectangular shape in plan view. The N pixel portions 11 are arranged in a row along a first direction X1 so as to be adjacent to each other. The M pixel arrays 12 are arranged so as to be adjacent to each other along a second direction X2 perpendicular to the first direction X1. The A-th (A is any integer of 1 to N) pixel portions 11 in the M pixel arrays 12 are arranged along the second direction X2. That is, in the pixel unit 2, N×M pixel portions 11 are arranged in a matrix.

When used in the X-ray image acquisition apparatus as described above, the imaging device 1 is arranged such that the first direction X1 matches the transport direction of the object. N may be an integer of 8 or more, or may be an integer of 16 or more. The larger N is, the more the S/N ratio can be improved by the TDI operation. Hereinafter, a case where N is 4 will be described as an example. However, the same applies when N is other values.

Each pixel portion 11 is, for example, a light receiving element capable of detecting scintillation light. In this example, the light receiving element is a photodiode formed of silicon. However, the light receiving element may be a photodiode formed of a compound semiconductor such as InGaAs or CdTe. In this example, the light receiving element is a surface type photodiode with a PN junction exposed on the surface. However, the light receiving element may be an embedded photodiode with a PN junction embedded thereinside.

The circuit section 3 includes M circuit units 5 provided corresponding to the M pixel arrays 12. In this example, the M circuit units 5 are electrically connected to the M pixel arrays 12, respectively. Specifically, the N pixel portions 11 of each of the M pixel arrays 12 and the M circuit units 5 are electrically connected to each other by N×M wirings 6. That is, the N pixel portions 11 of one pixel array 12 are electrically connected to the corresponding circuit units 5 by the N wirings 6. Each wiring 6 extends linearly along the first direction X1 so as to pass over the pixel portion 11, for example.

Figure 2:
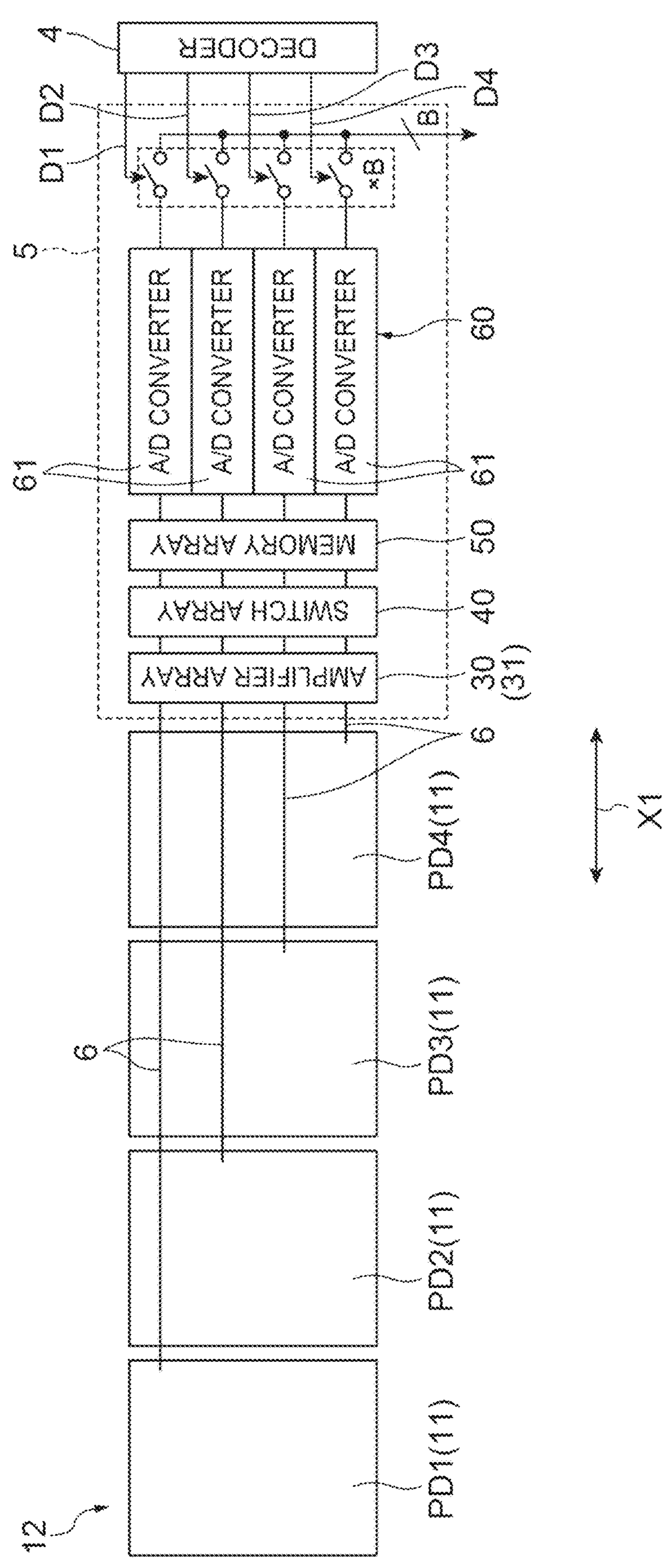
FIG. 2 is a diagram showing the circuit configurations of a pixel array and a circuit unit.

As shown in FIG. 2, each circuit unit 5 includes an amplifier array 30, a switch array (switch circuit) 40, a memory array 50, and an ADC (analog-to-digital converter) array 60. Hereinafter, the configurations and operations of one circuit unit 5 and the pixel array 12 corresponding to the circuit unit 5 will be described. However, the configurations and operations of other circuit units 5 and pixel arrays 12 are the same. In addition, the four pixel portions 11 included in the pixel array 12 are also referred to as pixel portions PD1, PD2, PD3, and PD4 in order far from the circuit unit 5.

Figure 3:
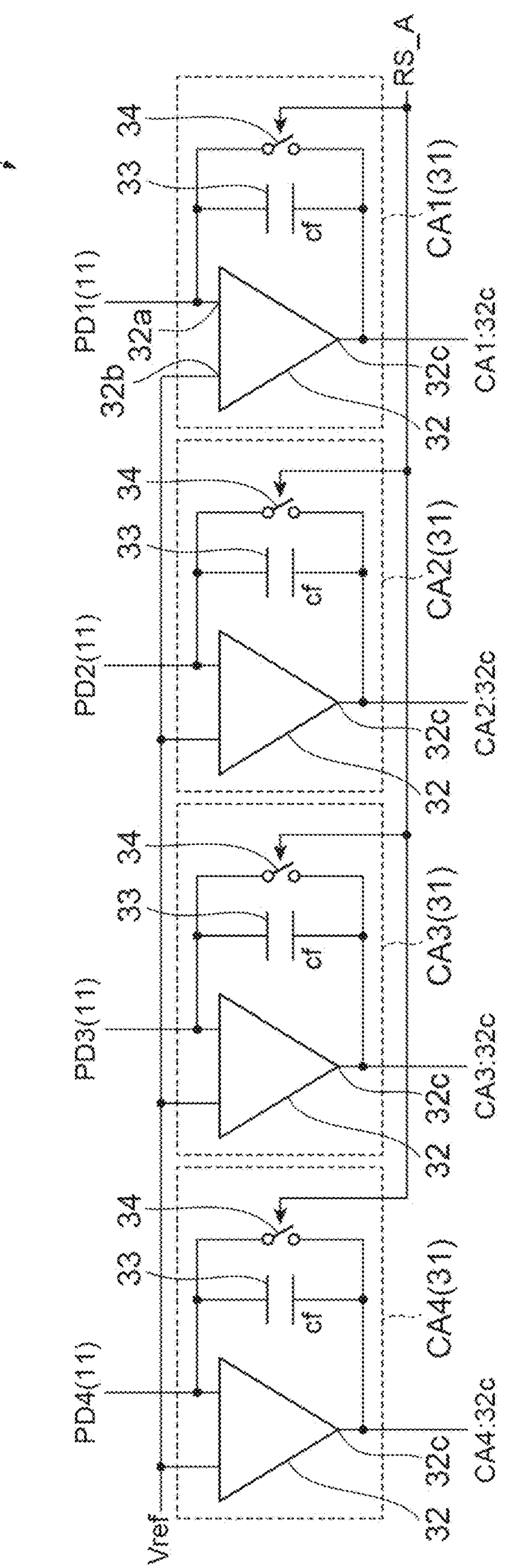
FIG. 3 is a diagram showing the circuit configuration of an amplifier array.

As shown in FIG. 3, the amplifier array 30 includes N (four in this example) charge amplifiers 31. Each charge amplifier 31 includes an operational amplifier 32, a capacitive portion 33, and a reset switch 34. The capacitive portion 33 is a feedback capacitor, and is connected between an inverting input terminal 32*a* and an output terminal 32*c* of the operational amplifier 32. A charge signal output from the pixel portion 11 is accumulated in the capacitive portion 33. A non-inverting input terminal 32*b* of the operational amplifier 32 is connected to a reference voltage Vref. The reset switch 34 is connected in parallel with the capacitive portion 33 between the inverting input terminal 32*a* and the output terminal 32*c*. The reset switch 34 is turned on and off according to a reset signal RS_A to reset the charge accumulated in the capacitive portion 33.

The four pixel portions 11 of the corresponding pixel array 12 are connected to the four charge amplifiers 31, respectively. More specifically, the charge signal from the pixel portion 11 is input to the inverting input terminal 32*a* of the operational amplifier 32. The charge amplifier 31 converts the charge signal output from the pixel portion 11 of the corresponding pixel array 12 into a voltage signal.

Hereinafter, the charge amplifiers 31 that receive signals from the pixel portions PD1, PD2, PD3, and PD4 are also referred to as charge amplifiers CA1, CA2, CA3, and CA4, respectively. The voltage signal from the charge amplifier 31 is output to switch units SU1 to SU4, which will be described later, through the output terminal 32*c*.

Figure 4:
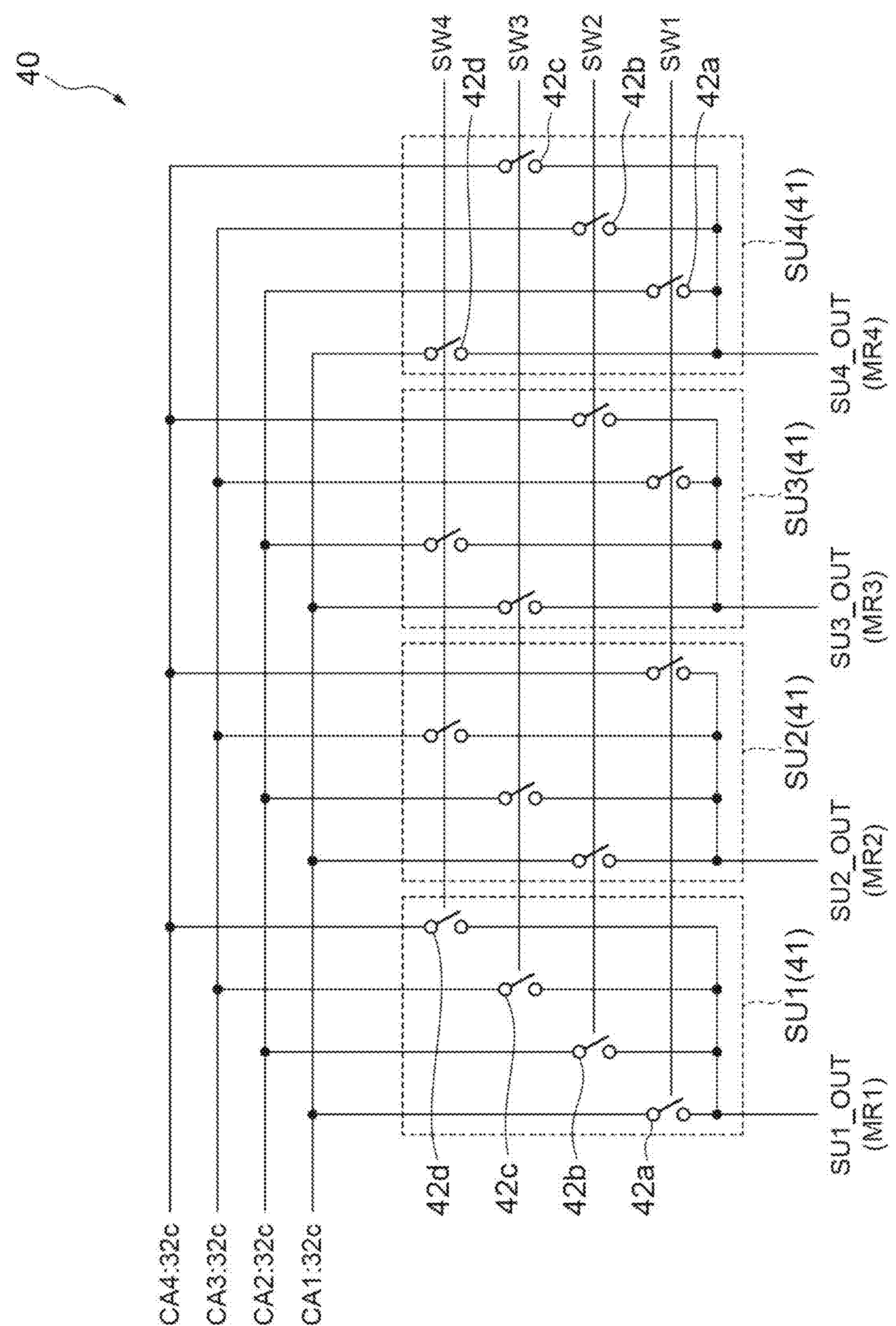
FIG. 4 is a diagram showing the circuit configuration of a switch array.

As shown in FIG. 4, the switch array 40 includes N (four in this example) switch units 41. Each switch unit 41 includes four switches 42*a*, 42*b*, 42*c*, and 42*d* connected to the four charge amplifiers 31 respectively. Output signals from the switch unit 41 are output to memory units MR1 to MR4, which will be described later. The switch array 40 is configured such that the connection state between the charge amplifiers CA1 to CA4 and the memory units MR1 to MR4 is switched according to the ON/OFF state of the switches 42*a* to 42*d*.

More specifically, in each switch unit 41, the switch 42*a* is turned on and off according to a switching signal SW1, the switch 42*b* is turned on and off according to a switching signal SW2, the switch 42*c* is turned on and off according to a switching signal SW3, and the switch 42*d* is turned on and off according to a switching signal SW4. The switch units 41 connected to the memory units MR1, MR2, MR3, and MR4 are referred to as the switch units SU1, SU2, SU3 and SU4, respectively. FIG. 4 shows output nodes SU1_OUT, SU2_OUT, SU3_OUT, and SU4_OUT of the switch units SU1, SU2, SU3, and SU4.

When the switching signal SW1 is ON and the switching signals SW2 to SW4 are OFF, the charge amplifiers CA1, CA4, CA3, and CA2 are connected to the memory units MR1, MR2, MR3, and MR4, respectively. When the switching signal SW2 is ON and the switching signals SW1, SW3, and SW4 are OFF, the charge amplifiers CA2, CA1, CA4, and CA3 are connected to the memory units MR1, MR2, MR3, and MR4, respectively. When the switching signal SW3 is ON and the switching signals SW1, SW2, and SW4 are OFF, the charge amplifiers CA3, CA2, CA1, and CA4 are connected to the memory units MR1, MR2, MR3, and MR4, respectively. When the switching signal SW4 is ON and the switching signals SW1 to SW3 are OFF, the charge amplifiers CA4, CA3, CA2, and CA1 are connected to the memory units MR1, MR2, MR3, and MR4, respectively.

Figure 5:
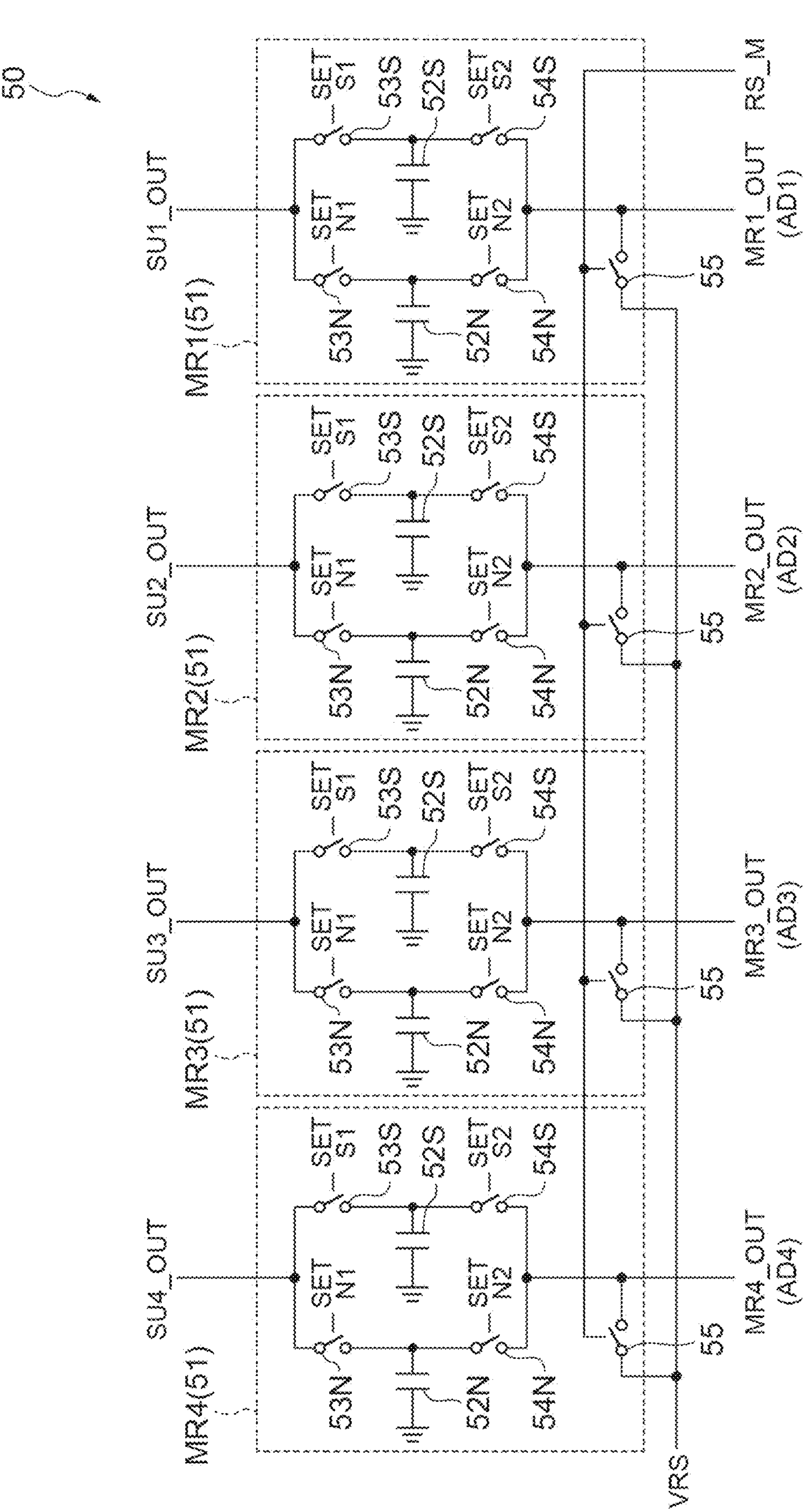
FIG. 5 is a diagram showing the circuit configuration of a memory array.

As shown in FIG. 5, the memory array 50 includes N (four in this example) memory units 51. In addition, the memory array 50 may include T (T is an integer of N or more) memory units 51. Each memory unit 51 includes capacitors 52N and 52S, switches 53N, 53S, 54N, and 54S, and a reset switch 55. The capacitor 52N holds a reference voltage (N level) in the voltage signal from the charge amplifier 31, and the capacitor 52S holds a signal voltage (S level) in the voltage signal from the charge amplifier 31. The difference between the signal voltage and the reference voltage is an effective signal.

The switches 53N and 53S are used to switch connection states between the capacitors 52N and 52S and the switch units SU1 to SU4, and the switches 54N and 54S are used to switch connection states between the capacitors 52N and 52S and A/D converters AD1 to AD4, which will be described later. The switches 53N and 53S are turned on and off according to switching signals SETN1 and SETS1, and the switches 54N and 54S are turned on and off according to switching signals SETN2 and SETS2.

The reset switch 55 is turned on and off according to a reset signal RS_M. When the reset switch 55 is turned on, a reset voltage VRS is supplied to reset the voltages of the input terminals of the A/D converters AD1 to AD4. The memory array 50 is provided to change the transfer order of signals because the order in which the voltage signal from the charge amplifier 31 is held in the capacitors 52N and 52S is the order of the S level and the N level and the order of AD conversion by an ADC array 60 is the order of the N level and the S level. Hereinafter, the memory units 51 connected to the switch units SU1, SU2, SU3, and SU4 (A/D converters AD1, AD2, AD3, and AD4) are also referred to as the memory units MR1, MR2, MR3, and MR4, respectively. FIG. 5 shows output nodes MR1_OUT, MR2_OUT, MR3_OUT, and MR4_OUT of the memory units MR1, MR2, MR3, and MR4.

Figure 6:
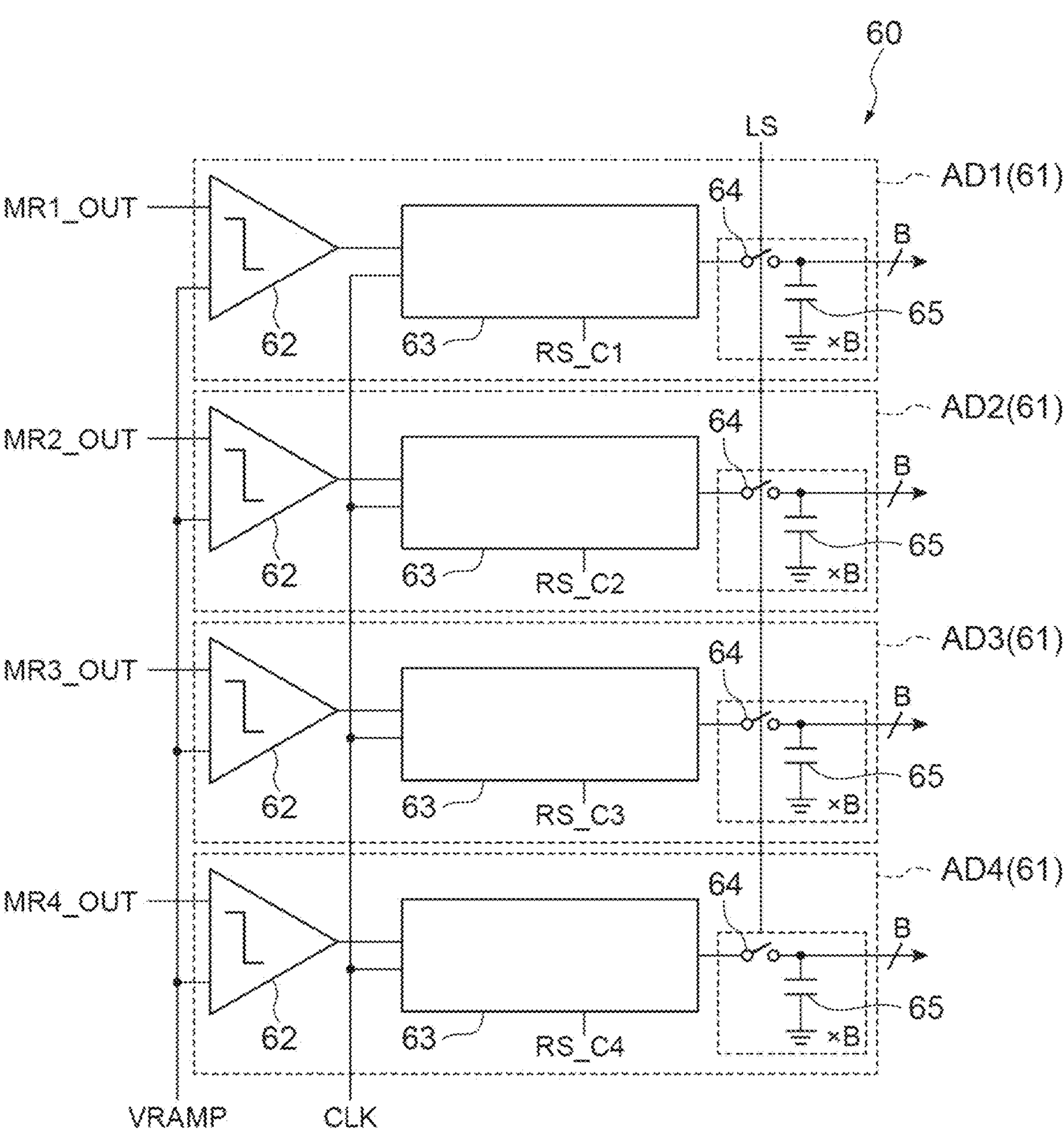
FIG. 6 is a diagram showing the circuit configuration of an ADC array.

As shown in FIG. 6, the ADC array 60 includes N (four in this example) A/D converters 61. In addition, the ADC array 60 may include T (T is an integer of N or more) A/D converters 61. In this example, each A/D converter 61 is of a single slope type, and includes a comparator 62, a counter 63 having B (B is an integer of 1 or more) bits, B latch switches 64, and B capacitors 65. The comparator 62 compares an output signal from the memory unit 51 with a ramp wave VRAMP. The counter 63 outputs a B-bit count value corresponding to the output signal from the comparator 62. The latch switch 64 latches the counter value output from the counter 63. The capacitor 65 holds the count value output from counter 63 according to ON/OFF of the latch switch 64. The counter 63 operates based on a clock pulse CLK. The latch switch 64 operates according to a latch signal LS.

In the A/D converter 61, the output of the comparator 62 changes according to the output signals from the memory units MR1 to MR4 (the charge signals from the pixel portions PD1 to PD4 and the voltage signals from the charge amplifiers CA1 to CA4), and the counter 63 performs counting according to the change. In this manner, A/D conversion for converting the voltage signal into a digital value is performed.

Assuming that the A/D converters 61 connected to the memory units MR1, MR2, MR3, and MR4 are A/D converters AD1, AD2, AD3, and AD4, respectively, individual reset signals RS_C1, RS_C2, RS_C3, and RS_C4 are input to the counters 63 of the A/D converters AD1, AD2, AD3, and AD4. Therefore, it is possible to independently reset the counters 63 of the A/D converters AD1 to AD4.

In each A/D converter 61, the counter 63 performs counting according to the received voltage signal and holds the count value. The counting performed by the counter 63 may be either counting up or counting down. In addition, the counter 63 performs counting according to the next input voltage signal based on the count value previously held in the counter 63, and holds the count value. That is, each counter 63 sequentially performs counting each time a voltage signal is input, and holds count values corresponding to all input voltage signals (addition processing).

The B capacitors 65 hold a voltage signal (addition signal) corresponding to the holding state (addition state) of the count value in the corresponding counter 63. That is, whether or not to hold the voltage signal in each capacitor 65 is determined according to the count value held in the corresponding counter 63. Therefore, by reading the holding state of the voltage signal in the B capacitors 65, a digital signal corresponding to the count value held in the counter 63 can be obtained. As described above, in the A/D converter 61, the comparator 62 and the counter 63 function as an addition processing portion that performs addition processing on the voltage signals output from any one of the charge amplifiers CA1 to CA4, and the B capacitor 65 functions as a holding portion that holds an addition signal corresponding to the addition state of the addition processing portion. The count value held in the counter 63 is reset by the input of the reset signals RS_C1 to RS_C4. The read timing of the holding state of the voltage signal in the capacitor 65 is controlled by the decoder 4.

Referring to FIG. 1 again, the M circuit units 5 are arranged so as to be adjacent to (face) the corresponding pixel array 12 in the first direction X1. Each circuit unit 5 has N arrangement regions R aligned in the second direction X2. In each arrangement region R, one charge amplifier 31, one memory unit 51, and one A/D converter 61 are arranged. The width of each arrangement region R in the second direction X2 is equal to or less than 1/N of the width of the pixel portion 11 in the second direction X2. That is, in the second direction X2, the width of an area including the N arrangement regions R is equal to or less than the width of the pixel portion 11.

[TDI Operation]

A TDI operation using the imaging device 1 will be described with reference to FIGS. 7 to 9. In the timing chart of FIG. 7, in order from the top, temporal changes of the reset signal RS_A, voltage signals from the charge amplifiers CA1 to CA4, the switching signals SW1 to SW4, the switching signals SETN1, SETS1, SETN2, and SETS2, and the reset signal RS_M and the operating states of the A/D converters AD1 to AD4 are shown. In the operating states of the A/D converters AD1 to AD4, "A/D Convert: CA1" means that the voltage signal from the charge amplifier CA1 is being A/D converted, and similarly, "A/D Convert: CA2 to CA4" means that the voltage signals from the charge amplifiers CA2 to CA4 are being A/D converted. "H" means that the signal is held, and "0" means that the signal is reset. The waveforms of the voltage signals from the charge amplifiers CA1 to CA4 are examples. The same applies to FIGS. 17, 18, 23, 24, 29, and 30 to be described later. In the timing chart of FIG. 8, in order from the top, the operating states of the A/D converters AD1 to AD4 and temporal changes of the latch signal LS, the reset signals RS_C1 to RS_C4, and read signals D1 to D4 are shown. The read signals D1 to D4 are signals output from the decoder 4 in order to control the read timing of the voltage holding state in the capacitor 65. When the read signals D1, D2, D3, and D4 are turned on, the voltage holding states in the capacitors 65 of the A/D converters AD1, AD2, AD3, and AD4 are read and converted into digital values (digital signals) (FIG. 2).

Figure 7:
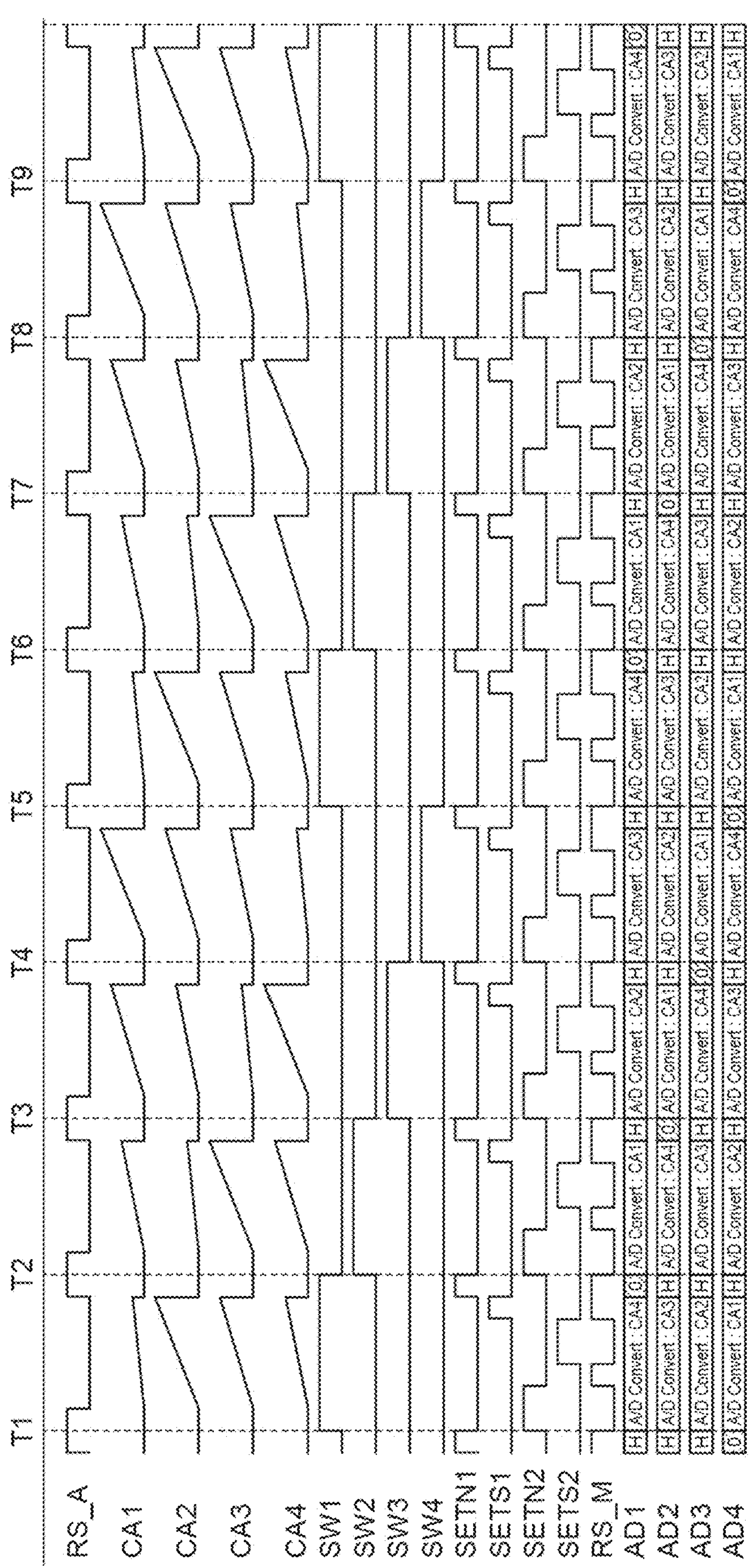
FIG. 7 is a timing chart showing the operation of the imaging device according to the embodiment.
Figure 8:
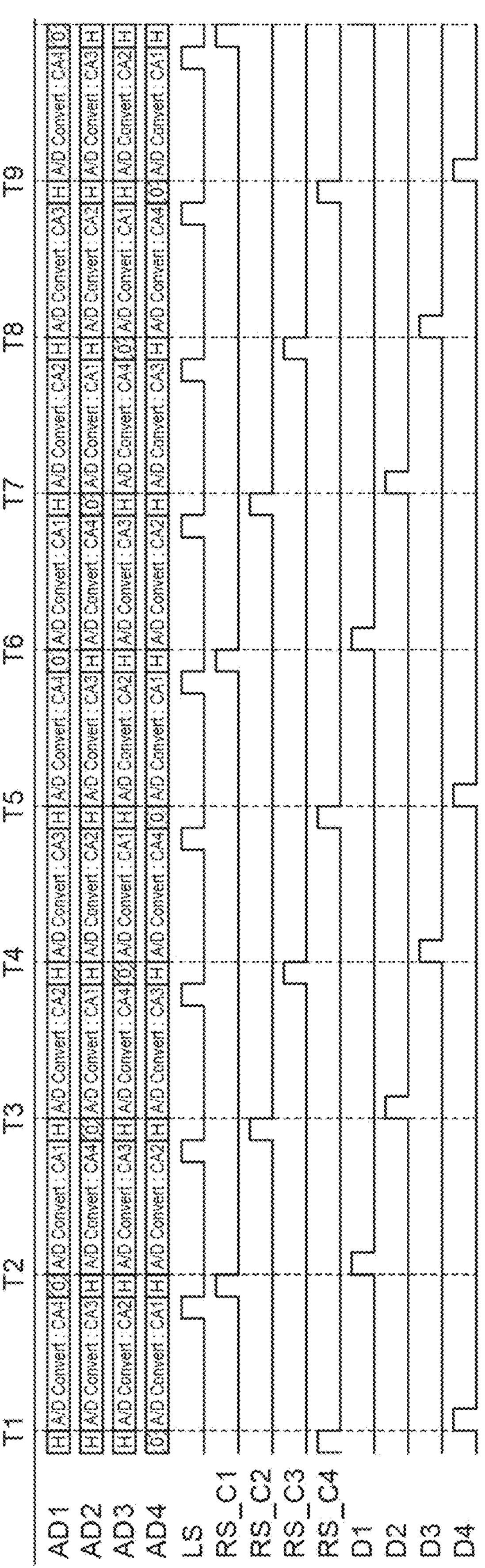
FIG. 8 is a timing chart showing the operation of the imaging device according to the embodiment.
Figure 9:
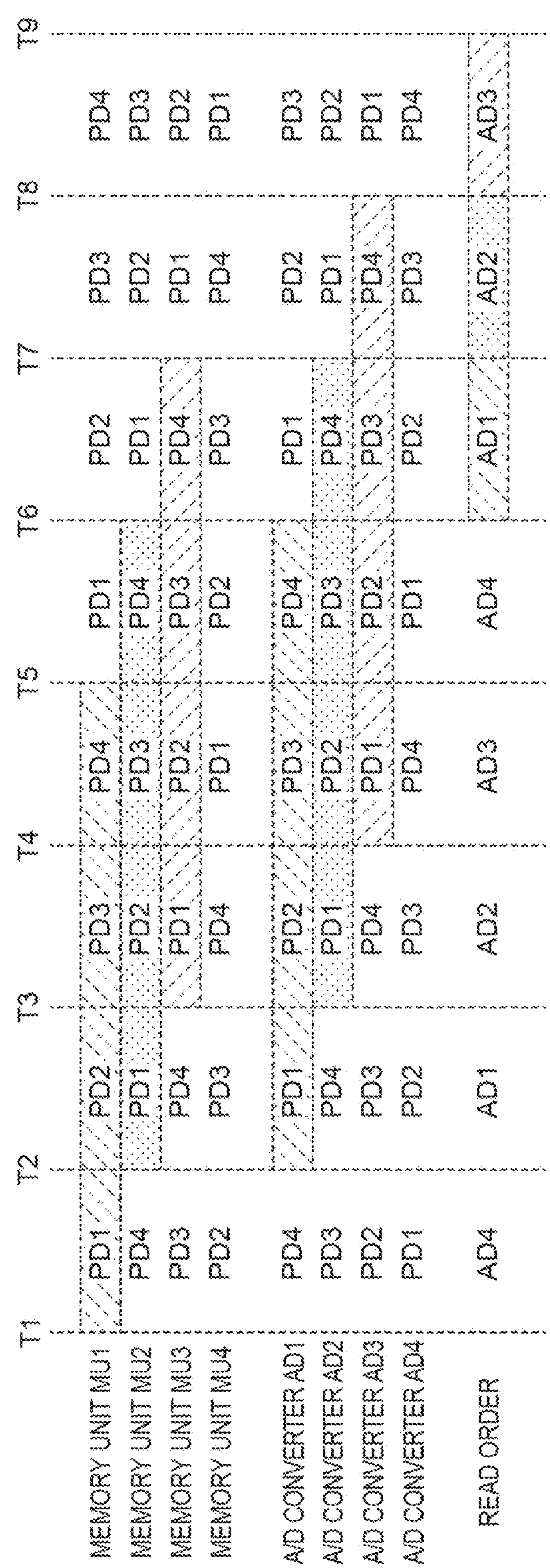
FIG. 9 is a timing chart showing the operation of the imaging device according to the embodiment.

As shown in FIGS. 7 to 9, in a period between times T1 and T2, the switching signal SW1 is turned on and the switching signals SW2 to SW4 are turned off, so that the charge amplifiers CA1, CA4, CA3, and CA2 are connected to the memory units MR1, MR2, MR3, and MR4, respectively. Then, when voltage signals (voltage signals corresponding to charge signals output from the pixel portions PD4, PD3, PD2 and PD1) are input from the charge amplifiers CA4, CA3, CA2, and CA1, each of the A/D converters AD1, AD2, AD3, and AD4 performs counting and holds the count value. At time T2, the read signal D1 is turned on, and the voltage state held in the capacitor 65 of the A/D converter AD1 is read and converted into a digital value. Before this reading, the reset signal RS_C1 is input to reset the counter 63 of the A/D converter AD1.

In a period between times T2 and T3, the switching signal SW2 is turned on and the switching signals SW1, SW3, and SW4 are turned off, so that the charge amplifiers CA2, CA1, CA4, and CA3 are connected to the memory units MR1, MR2, MR3, and MR4, respectively. Then, voltage signals (voltage signals corresponding to charge signals output from the pixel portions PD1, PD4, PD3, and PD2) are input from the charge amplifiers CA1, CA4, CA3, and CA2, and each of the A/D converters AD1, AD2, AD3, and AD4 performs counting and holds the count value. At time T3, the read signal D2 is turned on, and the voltage state held in the capacitor 65 of the A/D converter AD2 is read and converted into a digital value. Before this reading, the reset signal RS_C2 is input to reset the counter 63 of the A/D converter AD2.

In the period between times T2 and T3, the voltage signals from the charge amplifier 31 held in the capacitors 52N and 52S of the memory unit 51 in the period between times T1 and T2, which is a previous period, are transferred to the A/D converters AD1 to AD4 by turning on/off the switching signals SETN1, SETS1, SETN2, and SETS2. Therefore, in the period between times T2 and T3, the A/D converters AD1, AD2, AD3, and AD4 perform A/D conversion by performing counting according to the voltage signals from the charge amplifiers CA1, CA4, CA3, and CA2 connected to the memory units MR1, MR2, MR3, and MR4 in the period between times T1 and T2, which is a previous period. The same applies to other periods.

In a period between times T3 and T4, the switching signal SW3 is turned on and the switching signals SW1, SW2, and SW4 are turned off, so that the charge amplifiers CA3, CA2, CA1, and CA4 are connected to the memory units MR1, MR2, MR3, and MR4, respectively. Then, voltage signals (voltage signals corresponding to charge signals output from the pixel portions PD2, PD1, PD4, and PD3) are input from the charge amplifiers CA2, CA1, CA4, and CA3, and each of the A/D converters AD1, AD2, AD3, and AD4 performs counting. At time T4, the read signal D3 is turned on, and the voltage state held in the capacitor 65 of the A/D converter AD3 is read and converted into a digital value. Before this reading, the reset signal RS_C3 is input to reset the counter 63 of the A/D converter AD3.

In a period between times T4 and T5, the switching signal SW4 is turned on and the switching signals SW1 to SW3 are turned off, so that the charge amplifiers CA4, CA3, CA2, and CA1 are connected to the memory units MR1, MR2, MR3, and MR4, respectively. Then, voltage signals (voltage signals corresponding to charge signals output from the pixel portions PD3, PD2, PD1, and PD4) are input from the charge amplifiers CA3, CA2, CA1, and CA4, and each of the A/D converters AD1, AD2, AD3, and AD4 performs counting. At time T5, the read signal D4 is turned on, and the voltage state held in the capacitor 65 of the A/D converter AD4 is read and converted into a digital value. Before this reading, the reset signal RS_C4 is input to reset the counter 63 of the A/D converter AD4. An operation in a period between times T5 and T6, an operation in a period between times T6 and T7, an operation in a period between times T7 and T8, and an operation in a period between times T8 and T9 are similar to the operation in the period between times T1 and T2, the operation in the period between times T2 and T3, the operation in the period between T3 and T4, and the operation in the period T4 and T5, respectively.

By the operation described above, the output signals from the N pixel portions 11 are added in a TDI manner. In the above example, continuous TDI-like addition processing is realized by shifting the reset timing of the counter 63 in the A/D converters AD1 to AD4 by one frame. One frame corresponds to the length of the period between times T1 and T2. In this addition processing, the capacitors 65 (holding portions) of the A/D converters AD1 to AD4, which hold voltage signals corresponding to the charge signals output from the pixel portions PD1 to PD4, are switched according to the arrangement order of the pixel portions PD1 to PD4 along the first direction X1. In other words, the switch array 40 switches connection states between the charge amplifiers CA1 to CA4 and the capacitors 65 of the A/D converters AD1 to AD4 so that the above switching occurs.

Figure 10:
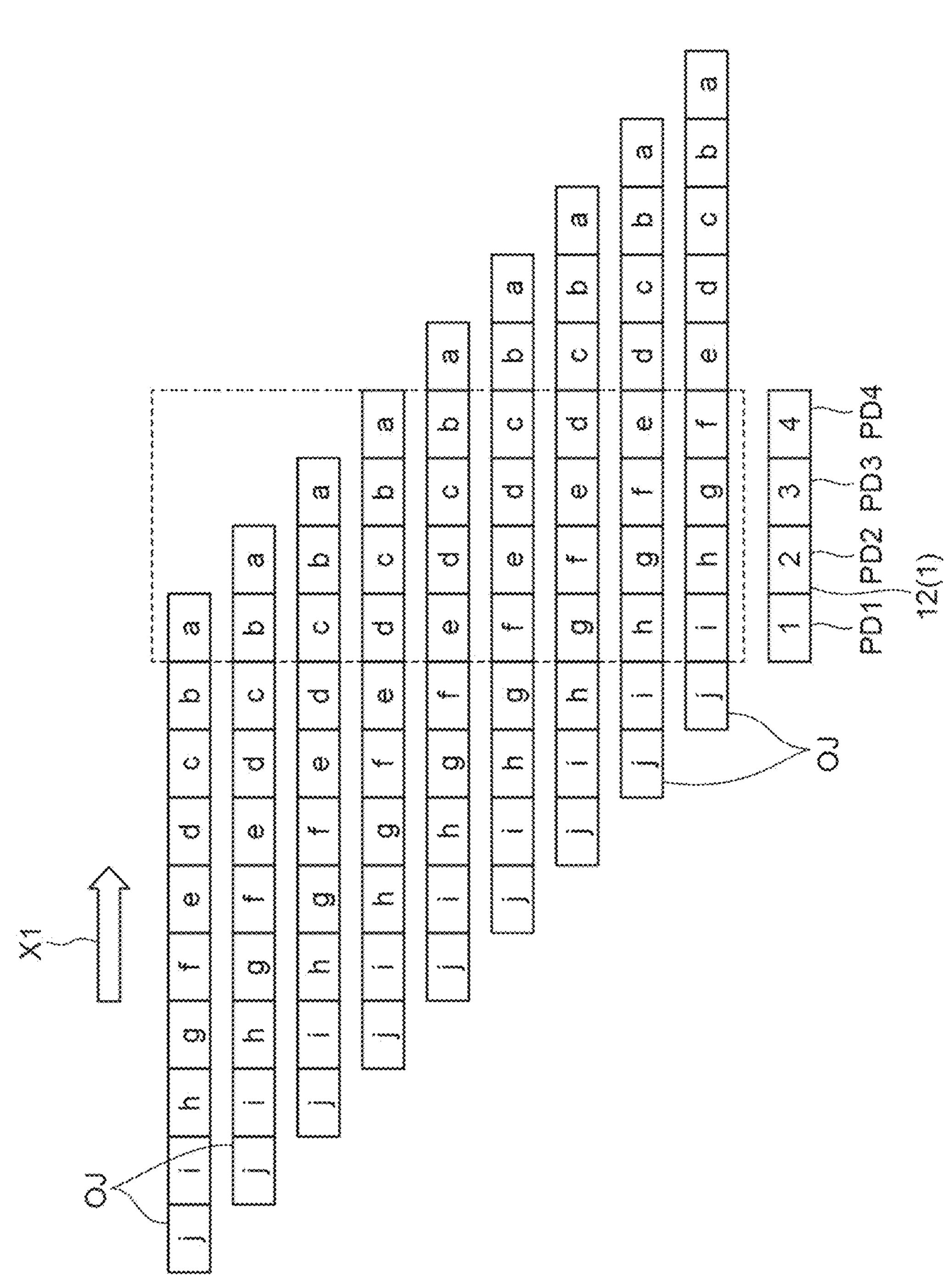
FIG. 10 is a diagram for explaining a TDI operation.

FIGS. 10 and 11 are diagrams for explaining addition processing by the TDI operation. FIGS. 10 and 11 show an example in which the imaging device 1 detects light (electromagnetic waves) from an object OJ transported along the transport direction (first direction X1). If the object OJ is divided into regions a to j according to the position along the transport direction, as shown in FIGS. 10 and 11, signals corresponding to the charge signals output from the pixel portions PD1 to PD4 when light transmitted through the same region in the object OJ is detected are input to the same A/D converters AD1 to AD4 by the TDI operation. For example, a signal based on the detection of light from the region a is input to the A/D converter AD1. Then, a voltage signal (4 a) corresponding to the count value corresponding to signals for four frames is held in the capacitor 65, and the voltage signal (4 a) is read as a digital value from the A/D converter AD1 at time T6. By acquiring the count value corresponding to the signal for N frames in this manner, the S/N ratio in the acquired image can be improved. In the TDI operation, the timing at which the switch array 40 switches the connection states between the charge amplifiers CA1 to CA4 and the A/D converters AD1 to AD4 is synchronized with the transportation (for example, transport speed) of the object OJ along the first direction X1.

[Function and Effect]

In the imaging device 1, each of the M circuit units 5 includes N charge amplifiers 31, N A/D converters 61, and the switch array 40 (switch circuit). Then, in each circuit unit 5, the connection state between the charge amplifier 31 and the capacitor 65 of the A/D converter 61 is switched so that the capacitor 65 (holding portion) of the A/D converter 61 that holds a voltage signal (addition signal) corresponding to the charge signal output from the pixel portion 11 is switched in accordance with the arrangement order of N pixel portions 11 along the first direction X1. In this manner, the TDI operation is realized. By realizing the TDI operation by such addition processing using the A/D converter 61, an increase in circuit size can be suppressed as compared with a case where a memory for simply digitally adding signals is provided in the circuit unit 5, for example. In addition, the amount of output signal can be reduced as compared with a case where signals are output to the outside of the imaging device 1 and digital addition processing is performed outside, for example. In addition, in the imaging device 1, the charge signal output from the pixel portion 11 is converted into a voltage signal by the charge amplifier 31, and the voltage signal is added by the A/D converter 61. Therefore, since the loss in transferring the charge signal from the pixel portion 11 can be reduced, an efficient TDI operation can be realized. As a result, according to the imaging device 1, an efficient TDI operation can be realized while suppressing an increase in circuit size and reducing the amount of output signal.

Figure 12:
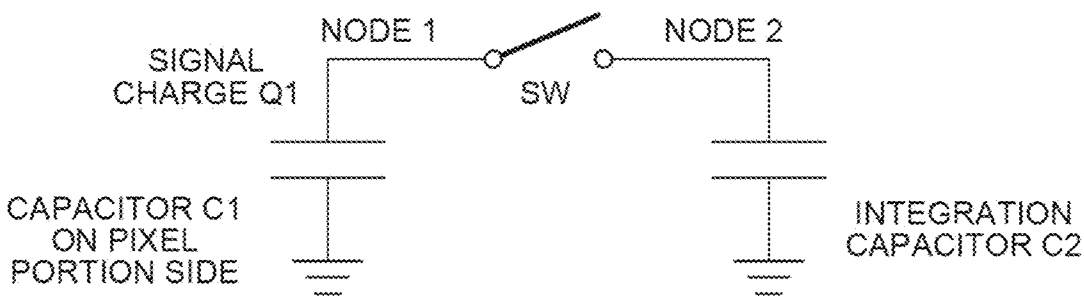
FIG. 12 is a circuit diagram for explaining charge transfer in a comparative example.
Figure 13:
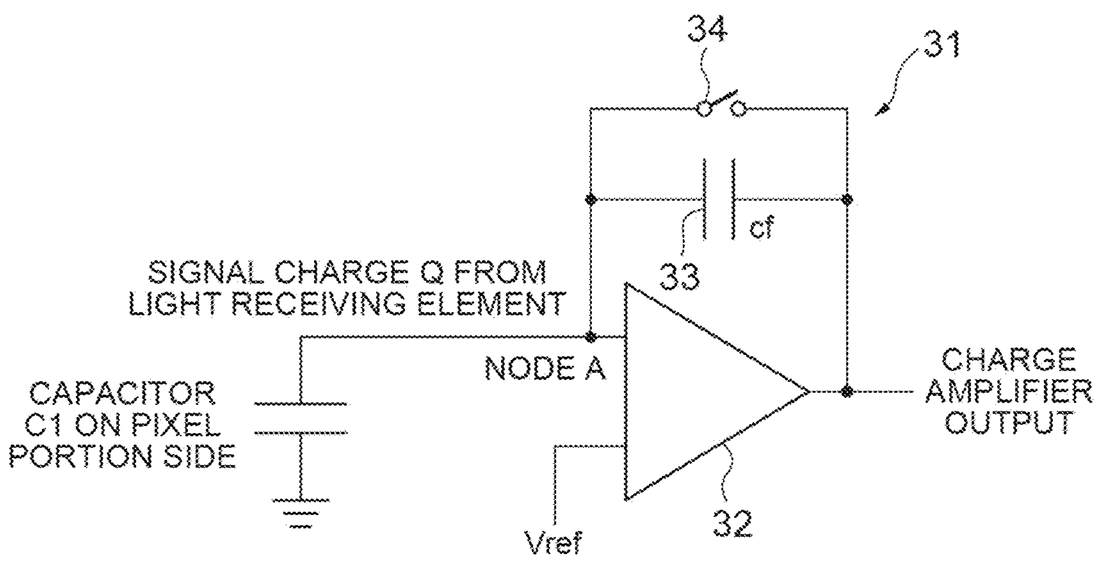
FIG. 13 is a circuit diagram for explaining charge transfer in the embodiment.

Reduction of the loss in transferring the charge signal from the pixel portion 11 will be described with reference to FIGS. 12 and 13. FIG. 12 is a circuit diagram for explaining charge transfer in a comparative example, and FIG. 13 is a circuit diagram for explaining charge transfer in the embodiment. In the comparative example shown in FIG. 12, a signal charge Q1 from a pixel portion is transferred to an integration capacitor C2 by turning on a switch SW. In this case, assuming that the capacitance on the pixel portion side (for example, the capacitance of a photodiode) is C1, a voltage V2 at node 2 is Q1/C2 if the signal charge Q1 is completely transferred. In practice, however, the voltage V2 at node 2 is Q1/(C1+C2). Thereafter, even if the switch SW is turned off, the charge transferred to the integration capacitor C2 is Q1×C2/(C1+C2), resulting in insufficient charge transfer (capacitance division).

On the other hand, as shown in FIG. 13, when the charge amplifier 31 is connected to the pixel portion 11, the electric potential at node A does not change depending on the signal charge Q from the pixel portion 11. Due to the effect of virtual grounding of the operational amplifier 32, the electric potential at node A continues to be the same potential as the reference voltage Vref. Since the electric potential at node A does not change, the entire signal charge Q is accumulated in the capacitive portion 33, and the output voltage from the charge amplifier 31 becomes Q/Cf. Therefore, the loss in transferring the charge signal can be reduced. Cf is the capacitance of the capacitive portion 33.

Each A/D converter 61 is of a single slope type. Therefore, it is possible to realize an efficient TDI operation with a simple configuration.

The switch array 40 is connected between the charge amplifier 31 and the comparator 62 (addition processing portion) of the A/D converter 61. Therefore, it is possible to realize an efficient TDI operation with a simple configuration.

The width of each arrangement region R in the second direction X2 is equal to or less than 1/N of the width of the pixel portion 11 in the second direction X2. Therefore, since the circuit units 5 can be arranged efficiently, an increase in circuit size can be further suppressed.

Each pixel portion 11 includes a surface type photodiode. Therefore, the area of the pixel portion 11 can be increased.

N is an integer of 8 or more. When the number of pixels is large like this, an increase in circuit size or an increase in the amount of output signal is likely to become a problem. However, even in such a case, the imaging device 1 can realize an efficient TDI operation while suppressing an increase in circuit size and reducing the amount of output signal.

Modification Examples

Figure 14:
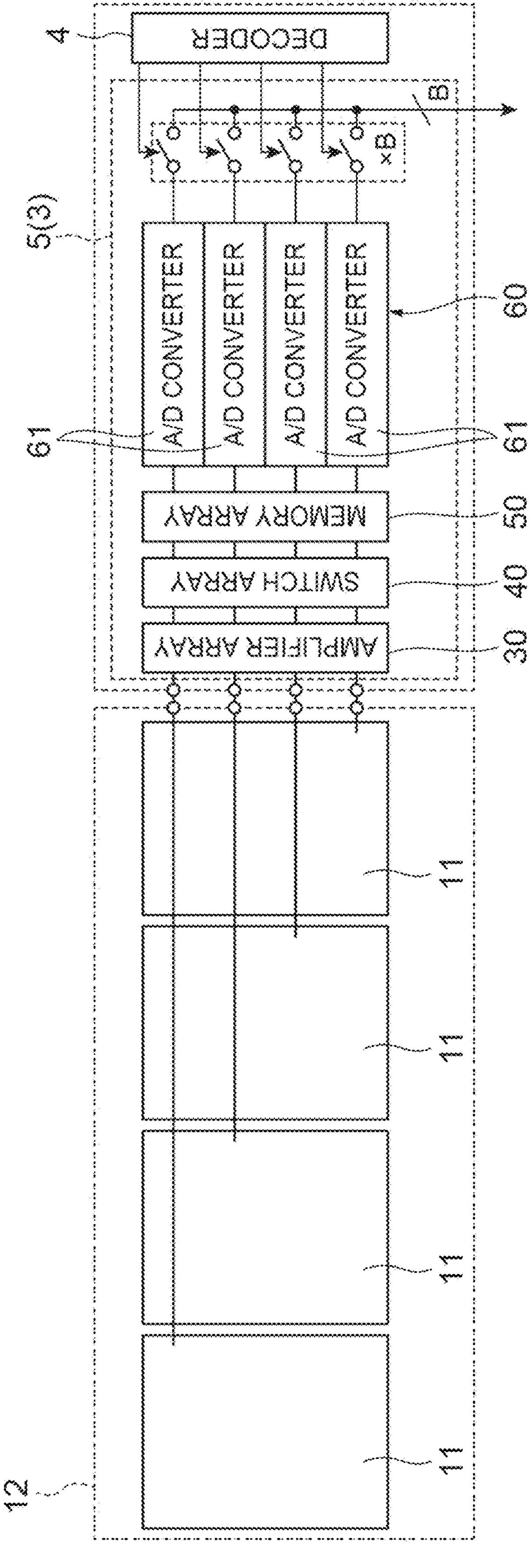
FIG. 14 is a diagram showing the circuit configurations of a pixel array and a circuit unit in a first modification example.

The imaging device 1 may be configured as in a first modification example shown in FIG. 14. In the embodiment described above, the entire imaging device 1 is formed on one chip. However, in the first modification example, the pixel unit 2, the circuit section 3, and the decoder 4 are formed on separate chips to be separated from each other. During use, the pixel unit 2 is electrically connected to the circuit section 3 (amplifier array 30). According to the first modification example as well, as in the embodiment described above, it is possible to realize an efficient TDI operation while suppressing an increase in circuit size and reducing the amount of output signal.

Figure 15:
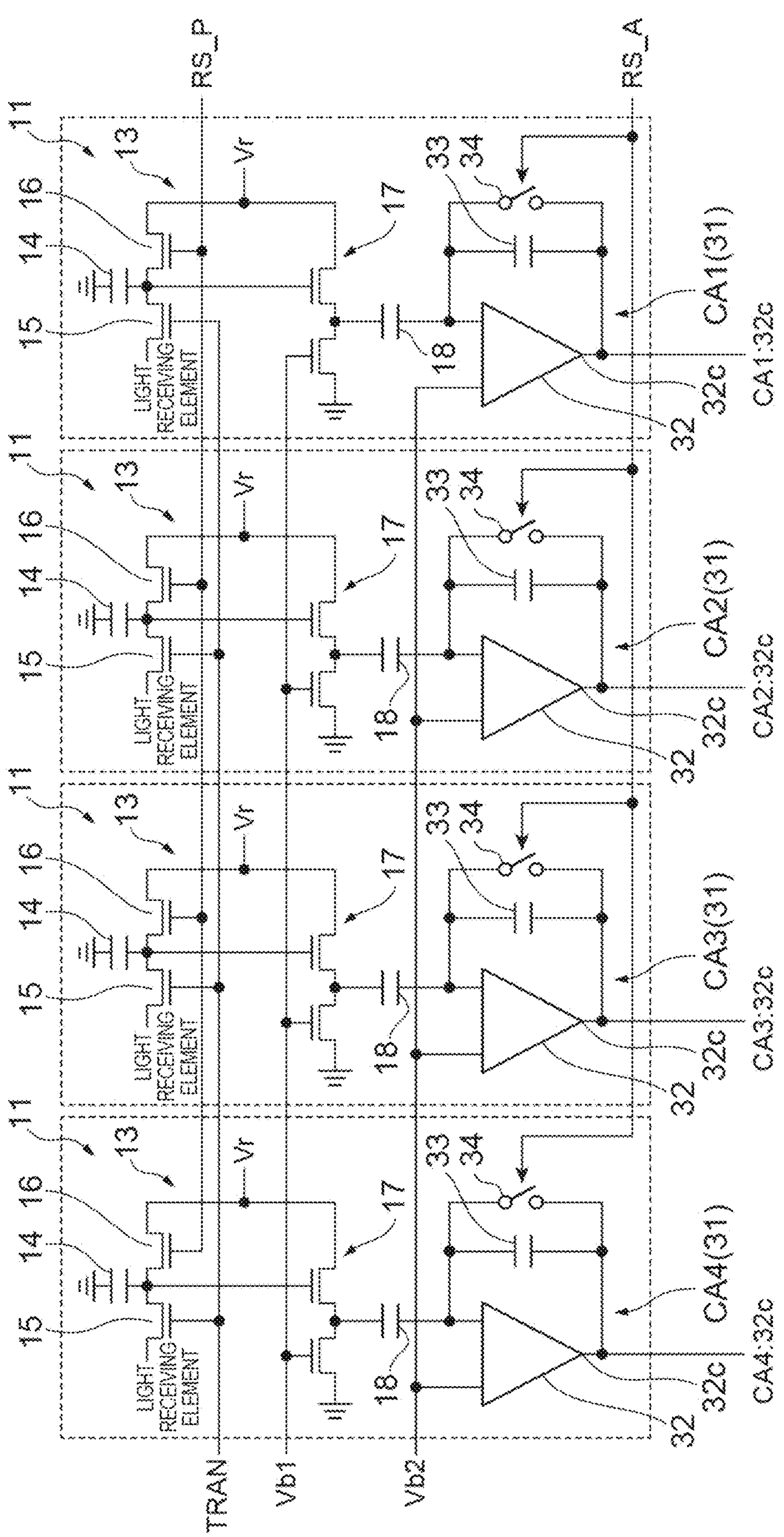
FIG. 15 is a diagram showing the circuit configurations of a pixel array and an amplifier array in a second modification example.

The imaging device 1 may be configured as in a second modification example shown in FIGS. 15 to 18. In the second modification example, the light receiving element of each pixel portion 11 is an embedded photodiode. Each pixel portion 11 has a pixel amplifier 13 in addition to the light receiving element. The pixel amplifier 13 includes a capacitor 14, transistors 15 and 16, and a source follower amplifier 17. The capacitor 14 is, for example, a floating diffusion, and is an accumulation region formed in a semiconductor substrate. All the signal charges of the light receiving element are transferred to the capacitor 14 and converted into a voltage. The transistor 15 is, for example, a MOS transistor, and controls transfer of the signal from the light receiving element to the capacitor 14. The transistor 16 is, for example, a MOS transistor, and controls resetting of the capacitor 14. The source follower amplifier 17 amplifies a voltage signal from the capacitor 14 and outputs the amplified voltage signal. The source follower amplifier 17 is connected to the charge amplifier 31 through a coupling capacitor 18. The output signal from the source follower amplifier 17 is converted into charge by the coupling capacitor 18 and then converted from charge to voltage again by the charge amplifier 31. In FIG. 15, Vr is the reset voltage of the capacitor 14, Vb1 is a bias voltage, Vb2 is a reference voltage, TRAN is a transfer signal, and RS_P is the reset signal of the capacitor 14.

Figure 16:
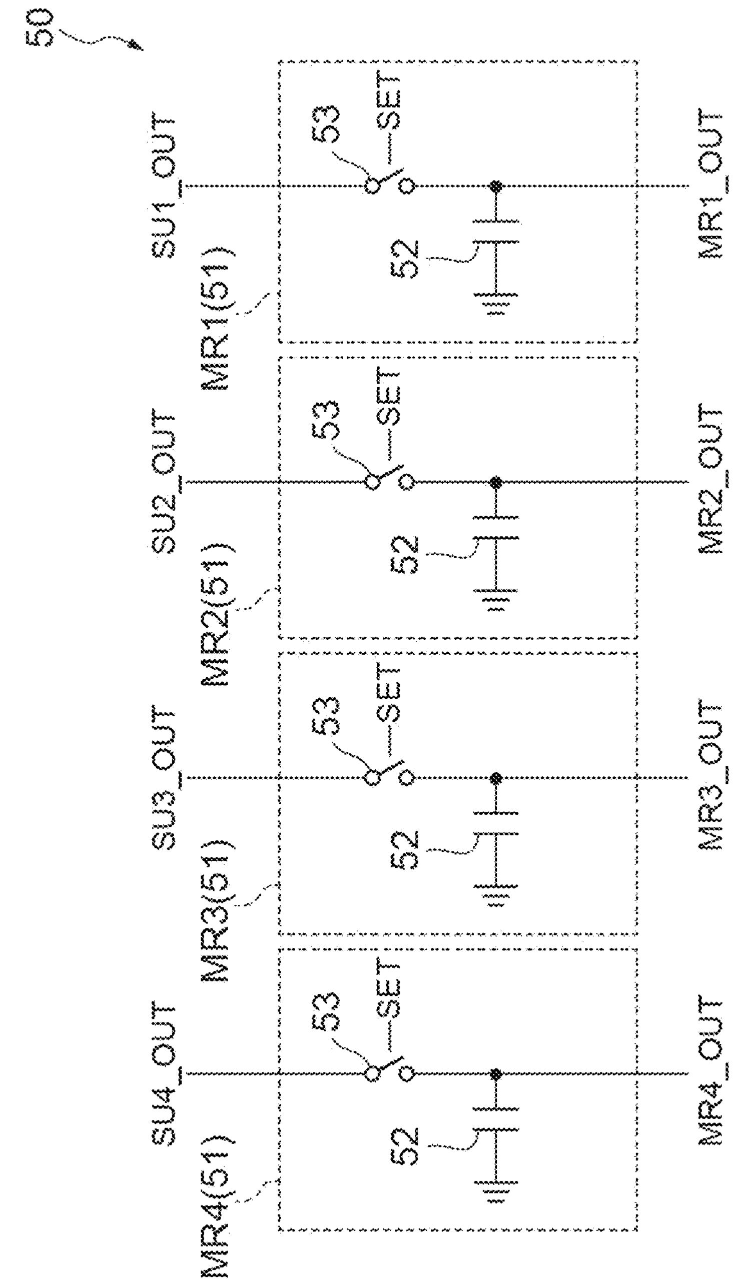
FIG. 16 is a diagram showing the circuit configuration of a switch array in the second modification example.

In the second modification example, as shown in FIG. 16, the memory unit 51 includes one capacitor 52 and one switch 53. In the second modification example, the order in which the voltage signal from the charge amplifier 31 is held in the capacitor 52 is the order of the N level and the S level, which is the same as the order of AD conversion by the ADC array 60. Therefore, only one pair of capacitor 52 and switch 53 are provided. The switch 53 is turned on and off according to a switching signal SET.

Figure 17:
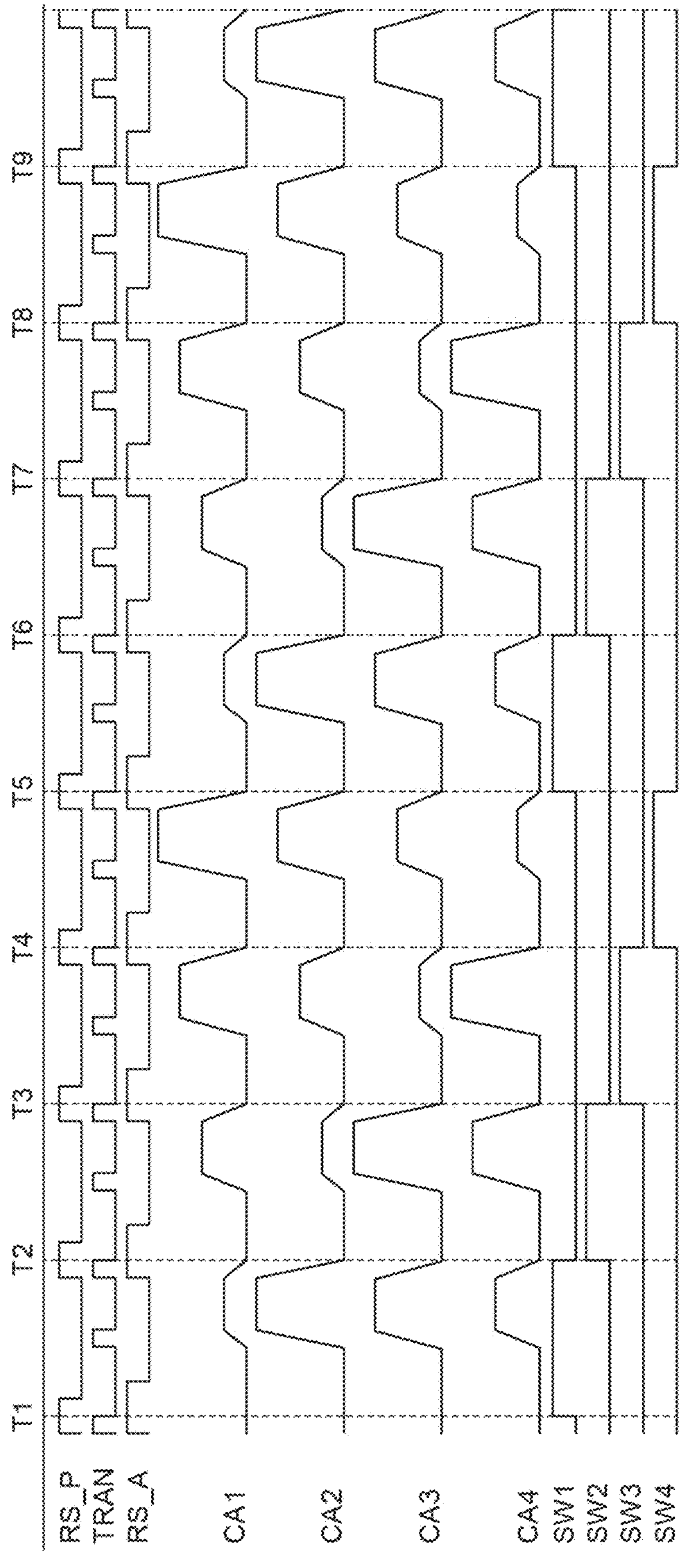
FIG. 17 is a timing chart showing the operation of an imaging device according to the second modification example.
Figure 18:
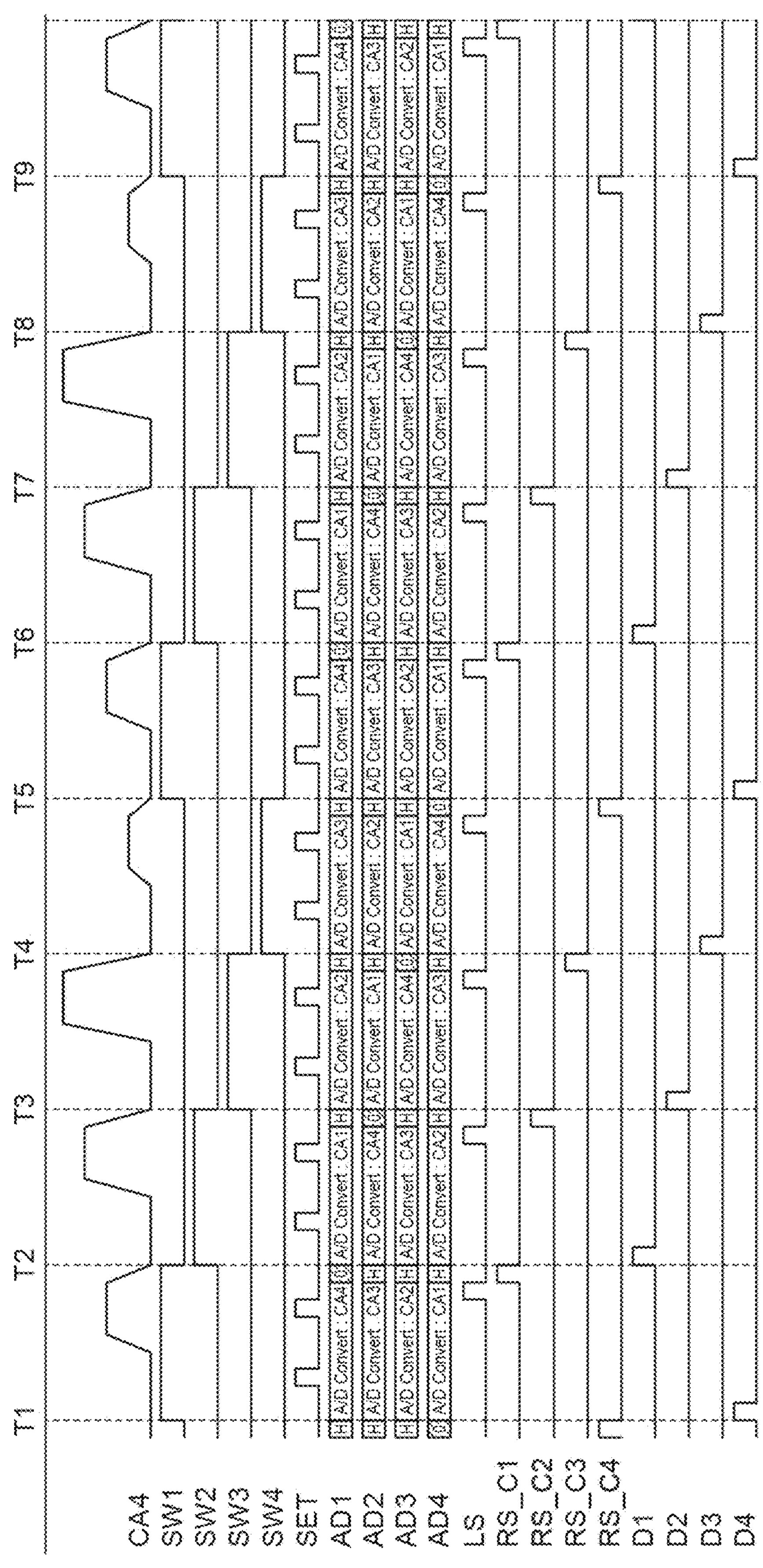
FIG. 18 is a timing chart showing the operation of the imaging device according to the second modification example.

FIGS. 17 and 18 are timing charts showing the operation of the imaging device 1 according to the second modification example. In the second modification example as well, the switch array 40 switches the connection states between the charge amplifiers CA1 to CA4 and the capacitors 65 of the A/D converters AD1 to AD4 so that the capacitors 65 (holding portions) of the A/D converters AD1 to AD4 that hold voltage signals corresponding to the charge signals output from the pixel portions PD1 to PD4 are switched according to the arrangement order of the pixel portions PD1 to PD4 along the first direction X1.

According to the second modification example as well, as in the embodiment described above, it is possible to realize an efficient TDI operation while suppressing an increase in circuit size and reducing the amount of output signal. In addition, since each pixel portion 11 includes an embedded photodiode, it is possible to achieve high sensitivity and low noise.

Figure 19:
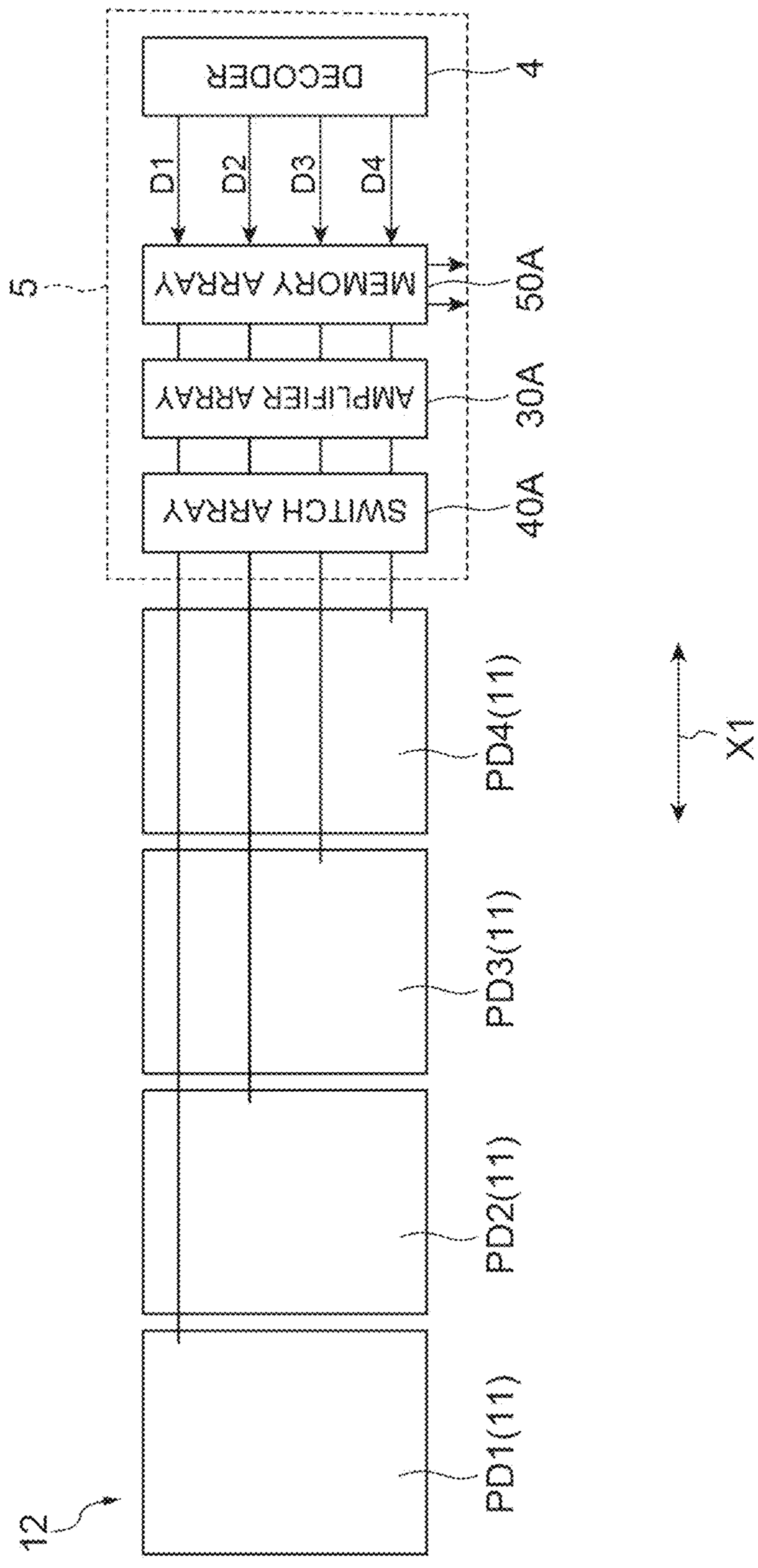
FIG. 19 is a diagram showing the circuit configurations of a pixel array and a circuit unit in a third modification example.

The imaging device 1 may be configured as in a third modification example shown in FIGS. 19 to 27. In the third modification example, the light receiving element of each pixel portion 11 is a surface type photodiode. As shown in FIG. 19, each circuit unit 5 includes a switch array (switch circuit) 40A, an amplifier array 30A, and a memory array 50A.

Figure 20:
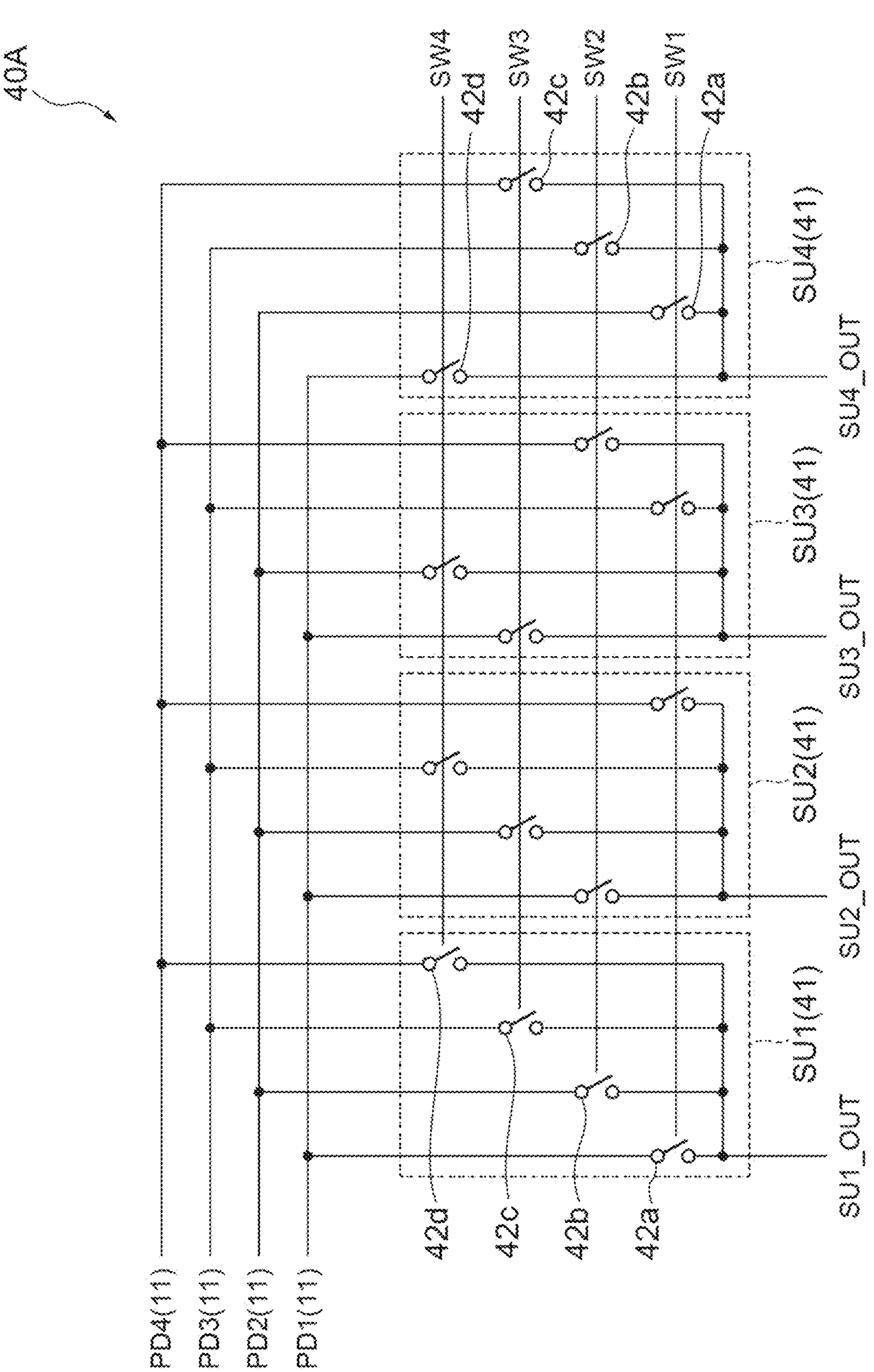
FIG. 20 is a diagram showing the circuit configuration of a switch array in the third modification example.

As shown in FIG. 20, the switch array 40A is configured similarly to the switch array 40 in the above-described embodiment except that the switch array 40A is connected between the pixel portion 11 and the amplifier array 30A. The switch array 40A is configured such that the connection states between the pixel portions PD1 to PD4 and the capacitive portions 33 of the charge amplifiers CA1 to CA4 are switched according to ON/OFF of the switches 42*a* to 42*d*.

Figure 21:
FIG. 21 is a diagram showing the circuit configuration of an amplifier array in the third modification example.
Figure 21:
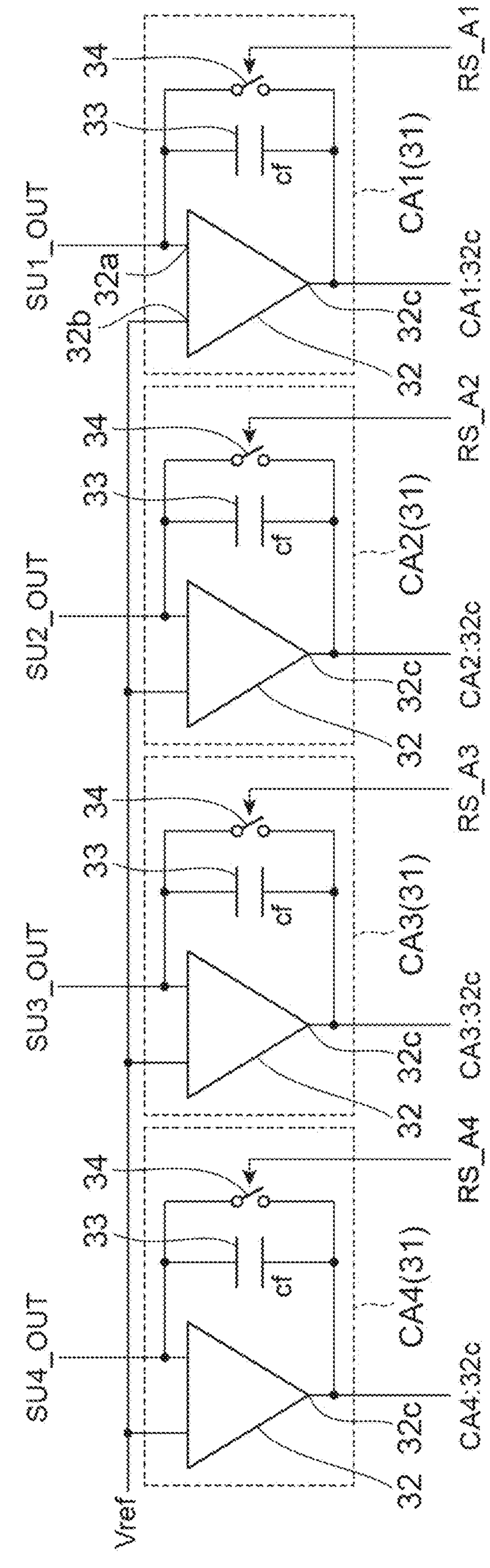

As shown in FIG. 21, the amplifier array 30A is connected between the switch units SU1 to SU4 and the memory units MR1 to MR4. Separate reset signals RS_A1, RS_AC2, RS_A3, and RS_A4 are input to the reset switches 34 of the charge amplifiers CA1, CA2, CA3, and CA4. Therefore, it is possible to independently reset the capacitive portions 33 of the charge amplifiers CA1 to CA. The amplifier array 30A is configured similarly to the amplifier array 30 in the above-described embodiment except for these points.

Figure 22:
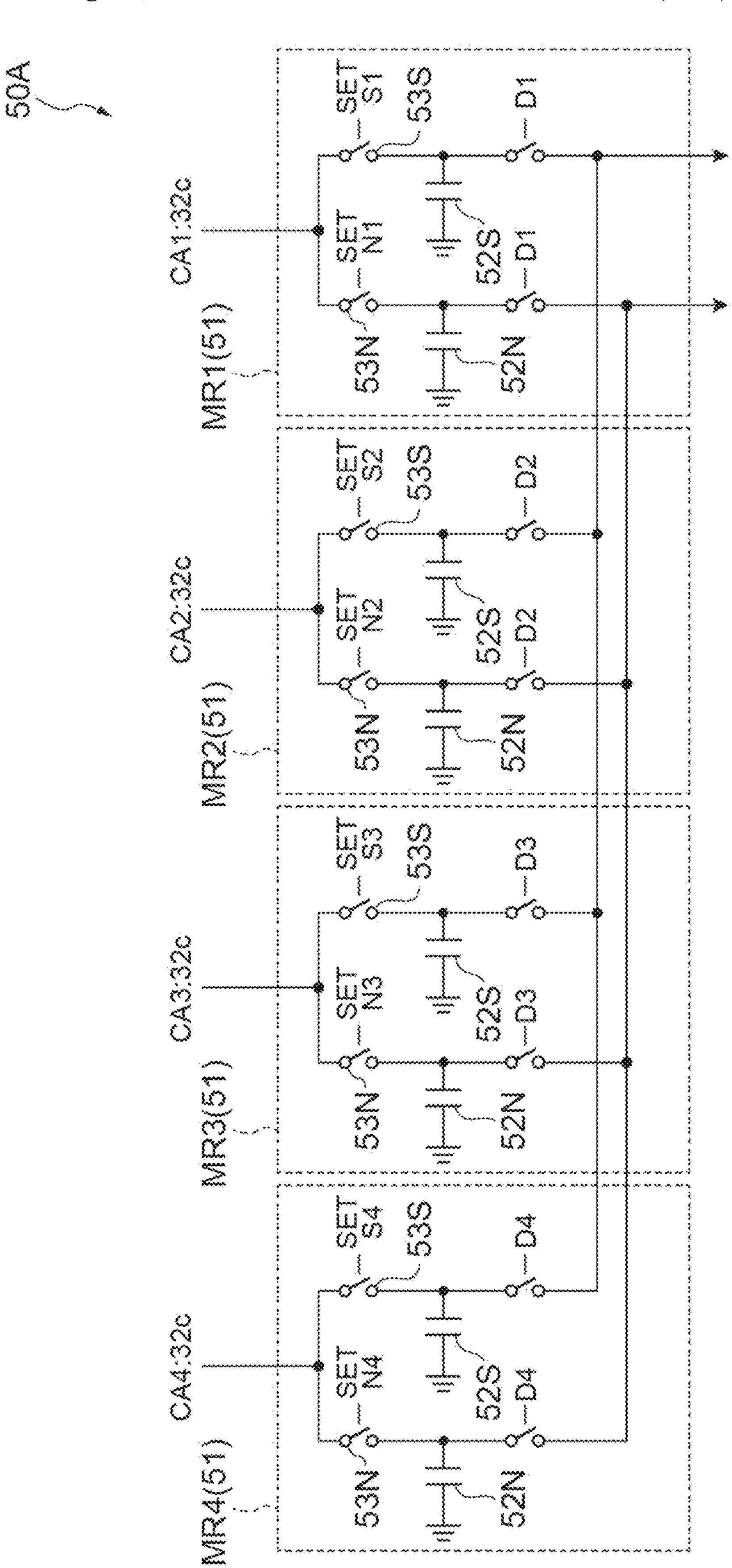
FIG. 22 is a diagram showing the circuit configuration of a switch array in the third modification example.

As shown in FIG. 22, voltage signals from the charge amplifiers CA1 to CA4 are input to the memory array 50A. Output signals from the memory units MR1 to MR4 are read by using, for example, a differential amplifier. In the memory unit MR1, the switches 53N and 53S are turned on and off according to the switching signals SETN1 and SETS1, and the switches 54N and 54S are turned on and off according to the read signal D1. In the memory unit MR2, the switches 53N and 53S are turned on and off according to the switching signals SETN2 and SETS2, and the switches 54N and 54S are turned on and off according to the read signal D2. In the memory unit MR3, the switches 53N and 53S are turned on and off according to the switching signals SETN3 and SETS3, and the switches 54N and 54S are turned on and off according to the read signal D3. In the memory unit MR4, the switches 53N and 53S are turned on and off according to the switching signals SETN4 and SETS4, and the switches 54N and 54S are turned on and off according to the read signal D4. The memory array 50A does not have the reset switch 55, and is reset when the differential amplifier described above is reset. The memory array 50A is configured similarly to the memory array 50 in the above-described embodiment except for these points.

In the third modification example as well, the M circuit units 5 are arranged so as to be adjacent to the corresponding pixel array 12 in the first direction X1, and each circuit unit 5 has N arrangement regions R aligned in the second direction X2. In addition, each circuit unit 5 may have T (T is an integer of N or more) arrangement regions R. In the third modification example, one charge amplifier 31 and one memory unit 51 are arranged in each arrangement region R. The width of each arrangement region R in the second direction X2 is equal to or less than 1/N of the width of the pixel portion 11 in the second direction X2.

Figure 23:
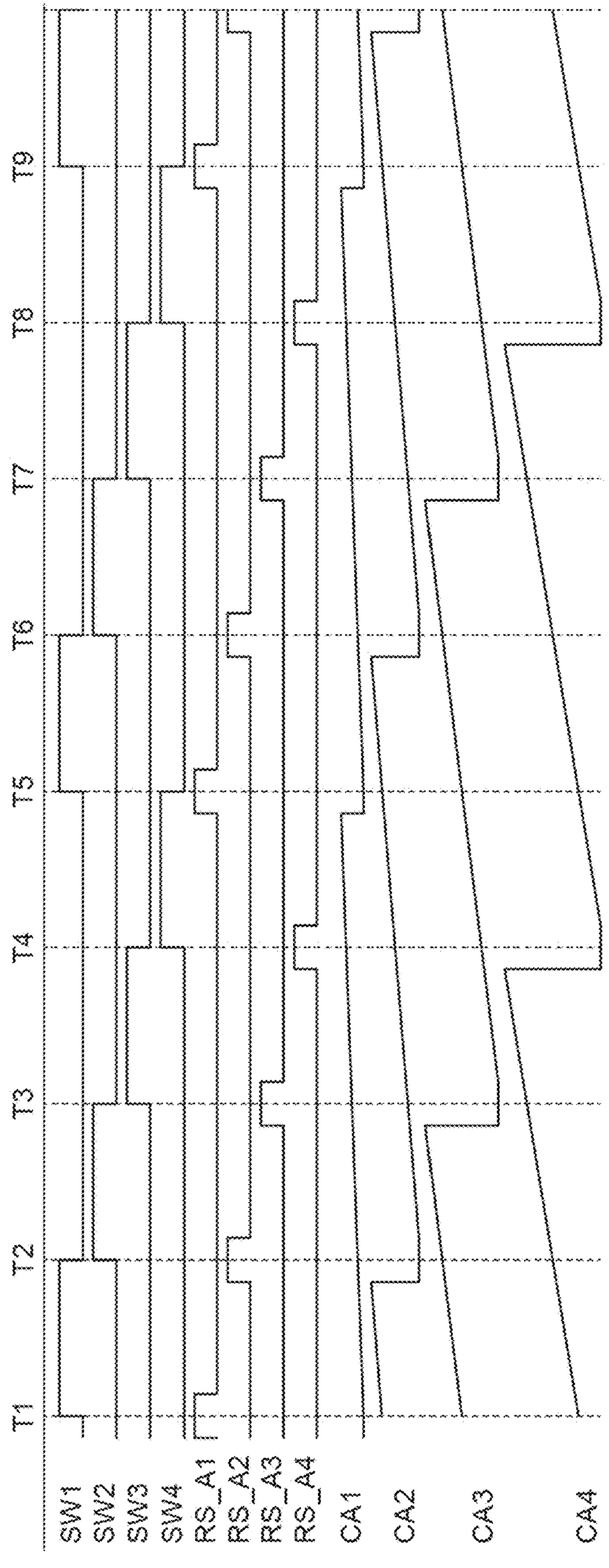
FIG. 23 is a timing chart showing the operation of an imaging device according to the third modification example.
Figure 24:
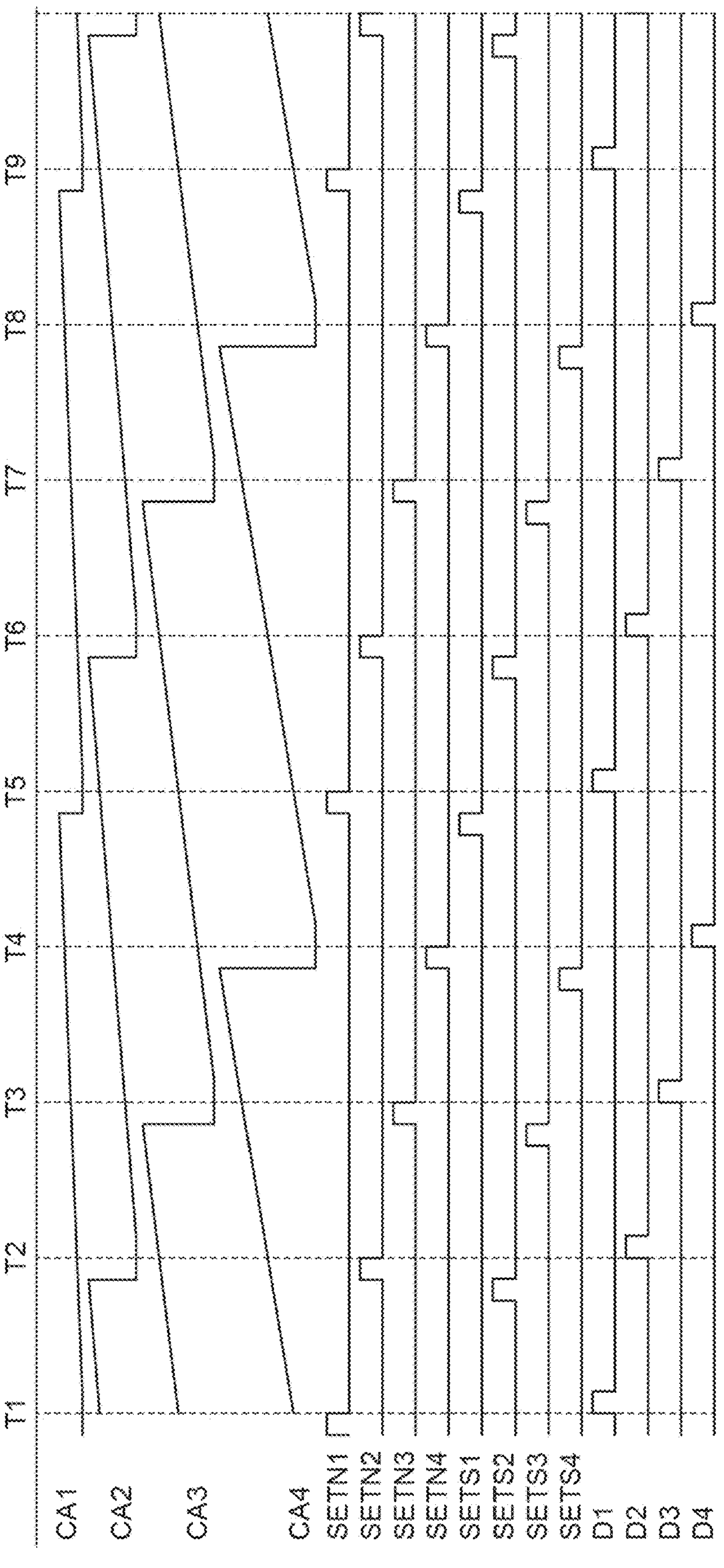
FIG. 24 is a timing chart showing the operation of the imaging device according to the third modification example.
Figure 26:
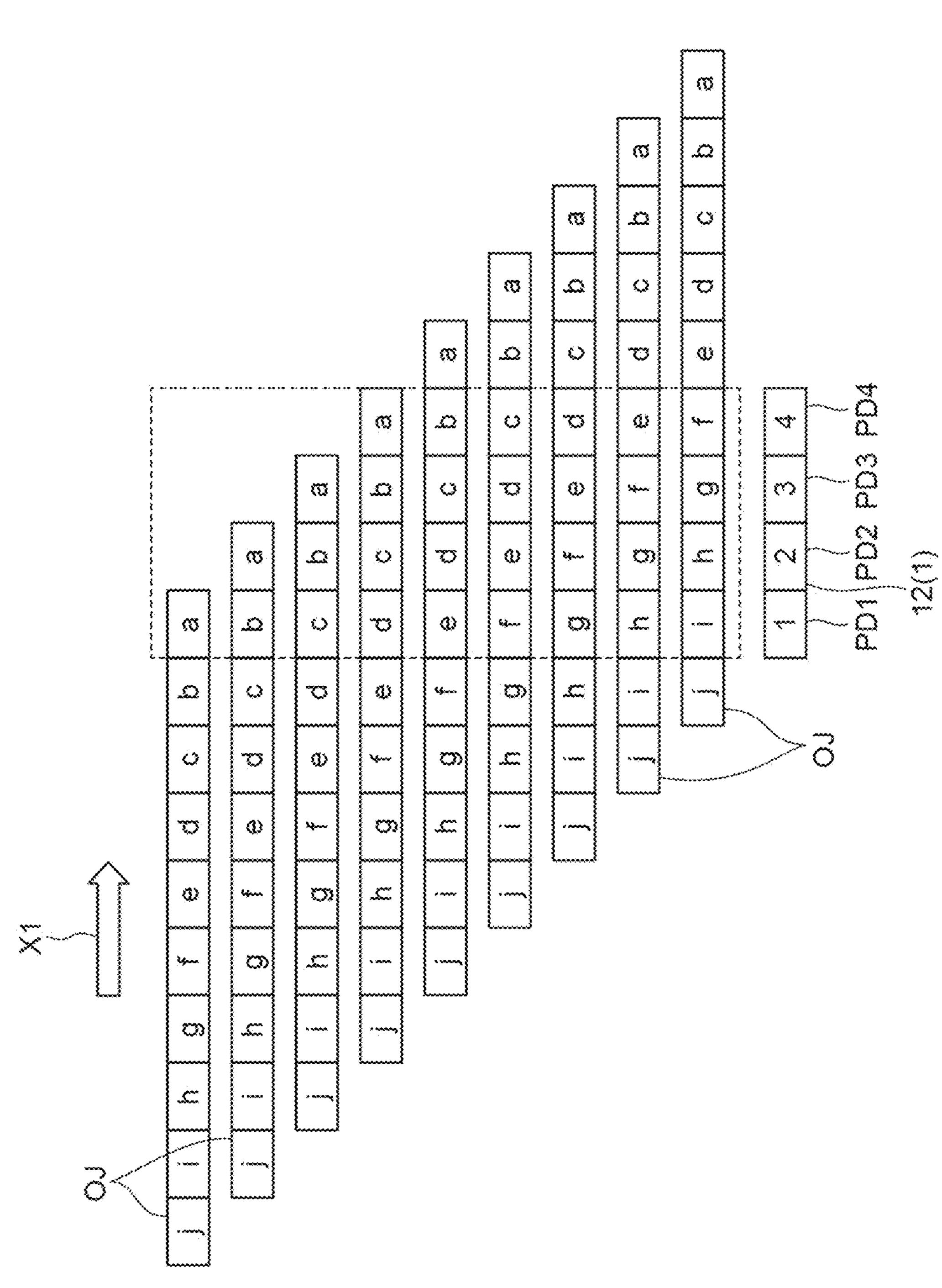
FIG. 26 is a diagram for explaining a TDI operation in the third modification example.

FIGS. 23 to 25 are timing charts showing the operation of the imaging device 1 according to the third modification example, and FIGS. 26 and 27 are diagrams for explaining addition processing by the TDI operation in the third modification example. In the third modification example, the capacitive portions 33 of the charge amplifiers CA1 to CA4 in which the charge signals output from the pixel portions PD1 to PD4 are accumulated are switched according to the arrangement order of the pixel portions PD1 to PD4 along the first direction X1.

That is, by each portion operating as shown in FIGS. 23 and 24, as shown in FIG. 25, the charge signals output from the pixel portions PD1, PD4, PD3, and PD2 are accumulated in the capacitive portions 33 of the charge amplifiers CA1, CA2, CA3, and CA4, respectively, in the period between times T1 and T2. At time T2, the charge signal accumulated in the capacitive portion 33 of the charge amplifier CA2 is read. In the period between times T2 and T3, the charge signals output from the pixel portions PD2, PD1, PD4, and PD3 are accumulated in the capacitive portions 33 of the charge amplifiers CA1, CA2, CA3, and CA4, respectively. At time T3, the charge signal accumulated in the capacitive portion 33 of the charge amplifier CA3 is read. In the period between times T3 and T4, the charge signals output from the pixel portions PD3, PD2, PD1, and PD4 are accumulated in the capacitive portions 33 of the charge amplifiers CA1, CA2, CA3, and CA4, respectively. At time T4, the charge signal accumulated in the capacitive portion 33 of the charge amplifier CA4 is read. In the period between times T4 and T5, the charge signals output from the pixel portions PD4, PD3, PD2, and PD1 are accumulated in the capacitive portions 33 of the charge amplifiers CA1, CA2, CA3, and CA4, respectively. At time T5, the charge signal accumulated in the capacitive portion 33 of the charge amplifier CA1 is read.

As shown in FIGS. 26 and 27, in the TDI operation in the third modification example, the charge signals output from the pixel portions PD1 to PD4 when light transmitted through the same region in the object OJ is detected are added (accumulated) as analog values in the same charge amplifiers CA1 to CA4. For example, a signal based on the detection of light from the region a is added by the charge amplifier CA1. Then, a charge signal (4 a) obtained by adding the signals for four frames is read from the charge amplifier CA1 at time T5.

According to the third modification example as well, it is possible to realize an efficient TDI operation while suppressing an increase in circuit size and reducing the amount of output signal. That is, in the imaging device 1 according to the third modification example, each of the M circuit units 5 includes the N charge amplifiers 31 and the switch array 40A (switch circuit). Then, in each circuit unit 5, the connection state between the pixel portion 11 and the charge amplifier 31 is switched so that the capacitive portion 33 of the charge amplifier 31 in which the charge signal output from the pixel portion 11 is accumulated (added as charge (analog value)) is switched according to the arrangement order of N pixel portions 11 along the first direction X1. In this manner, the TDI operation is realized. By realizing the TDI operation by such analog addition processing using the charge amplifier 31, an increase in circuit size can be suppressed as compared with a case where a memory for simply digitally adding signals is provided in the circuit unit 5, for example. In addition, the amount of output signal can be reduced as compared with a case where signals are output to the outside of the imaging device 1 and digital addition processing is performed outside, for example. In addition, in the imaging device 1, the charge signal output from the pixel portion 11 is accumulated in the capacitive portion 33 of the charge amplifier 31, analog-added, and converted into a voltage signal by the charge amplifier 31. Therefore, since the loss in transferring the charge signal from the pixel portion 11 can be reduced, an efficient TDI operation can be realized. As a result, even with the imaging device 1 according to the third modification example, it is possible to realize an efficient TDI operation while suppressing an increase in circuit size and reducing the amount of output signal.

In addition, since the width of each arrangement region R in the second direction X2 is equal to or less than 1/N of the width of the pixel portion 11 in the second direction X2, the circuit units 5 can be efficiently arranged. As a result, an increase in circuit size can be further suppressed. In addition, in the third modification example, a memory section having only one memory unit 51 may be provided instead of the memory array 50, and a shift register may be provided instead of the decoder 4. Even in this case, the TDI operation can be realized. However, by performing reading with the decoder 4 using the memory array 50 having N memory units 51 as in the third modification example, it is possible to change the number of frames to be added.

Figure 28:
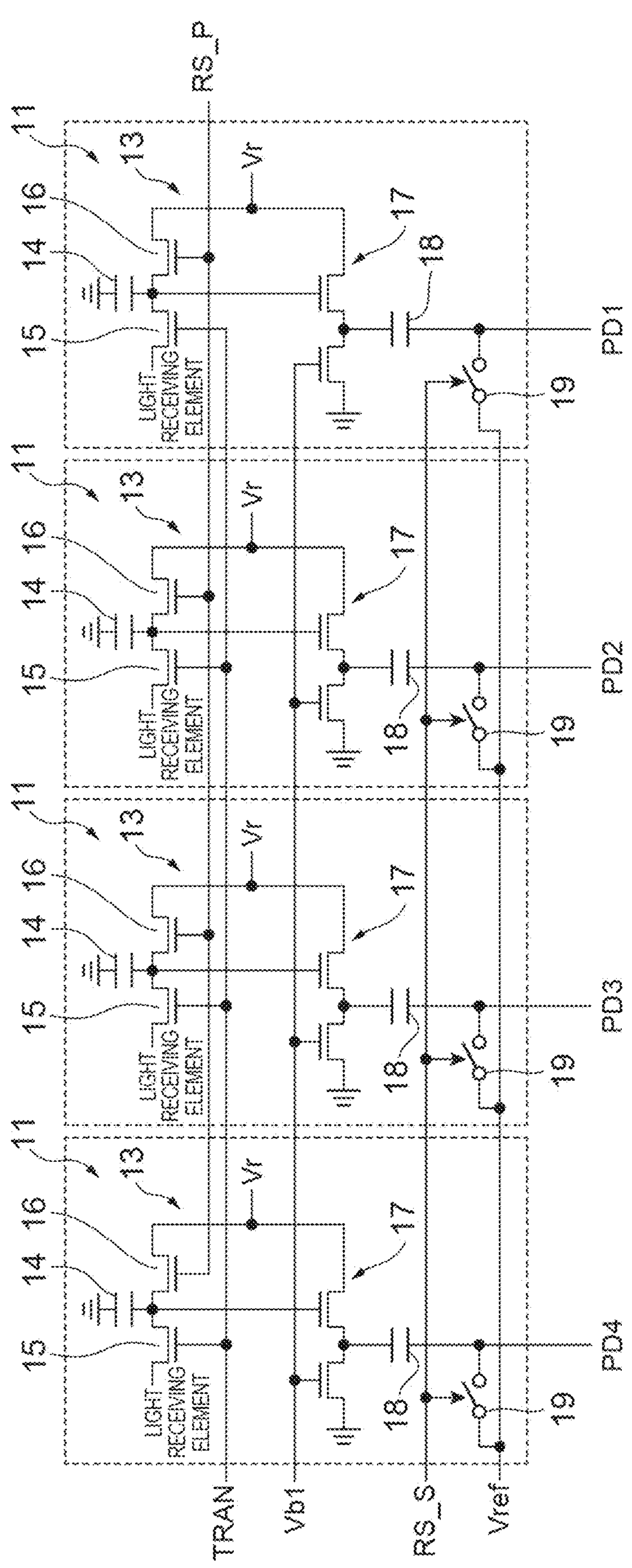
FIG. 28 is a diagram showing the circuit configurations of a pixel array and a circuit unit in a fourth modification example.
Figure 29:
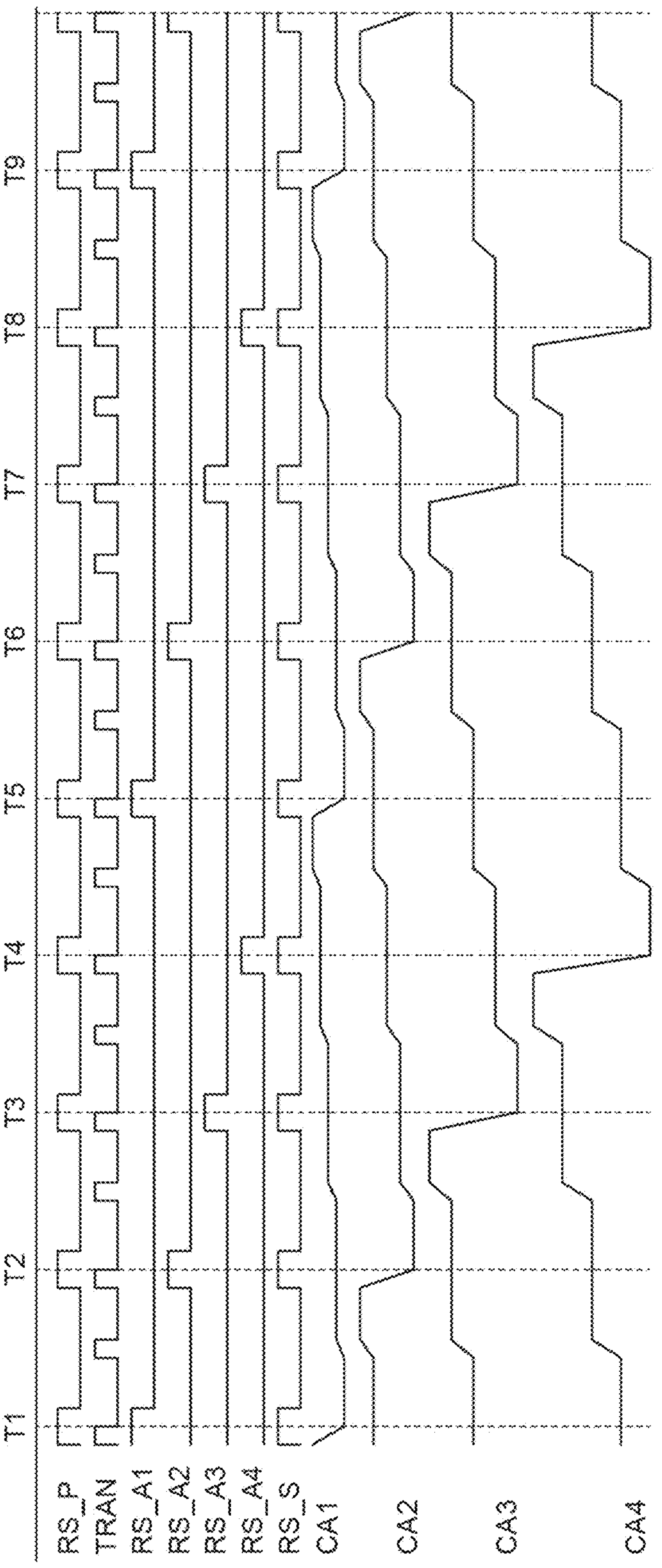
FIG. 29 is a timing chart showing the operation of an imaging device according to the fourth modification example.
Figure 30:
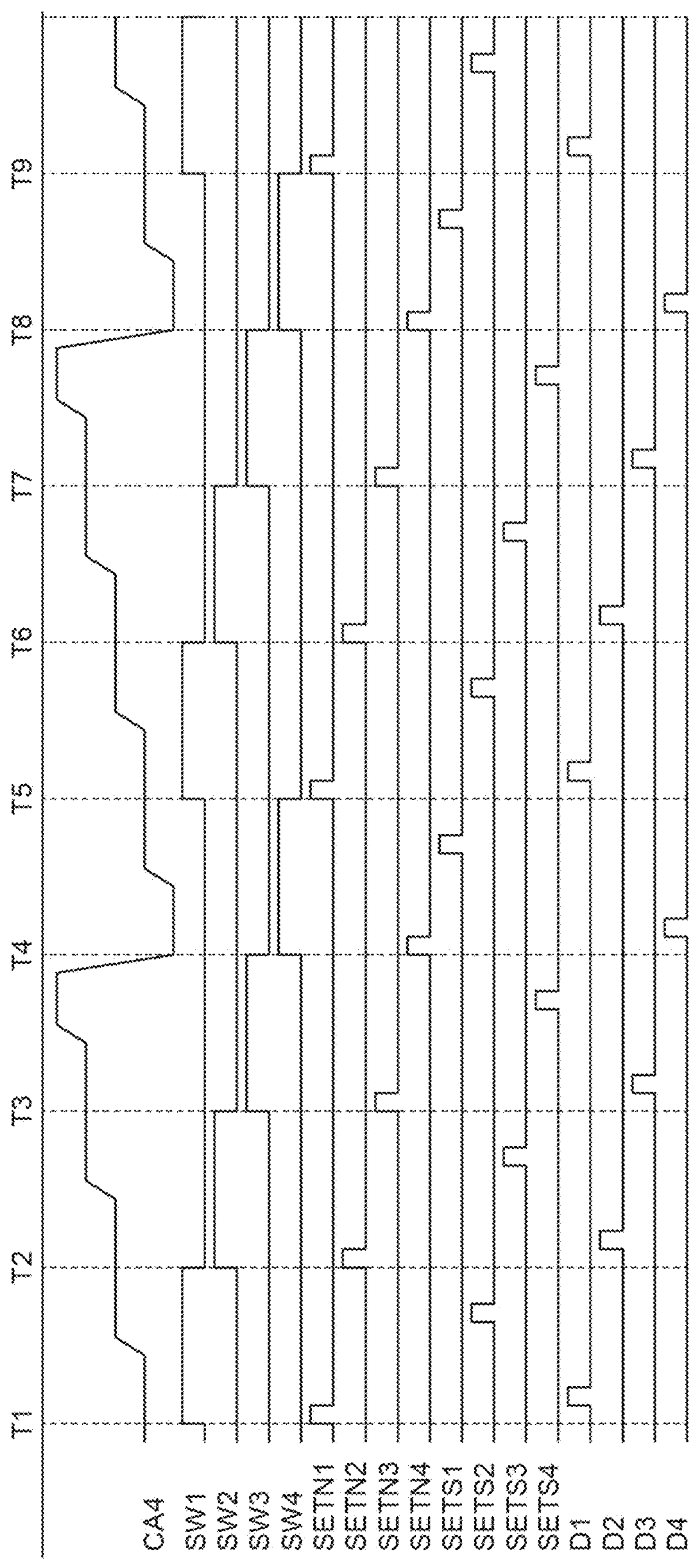
FIG. 30 is a timing chart showing the operation of the imaging device according to the fourth modification example.

As a fourth modification example, the light receiving element of each pixel portion 11 may be an embedded photodiode in the third modification example. In the fourth modification example, as shown in FIG. 28, each pixel portion 11 has a pixel amplifier 13 in addition to the light receiving element, similarly to the second modification example. Each pixel portion 11 is connected to the switch unit 41 through the coupling capacitor 18. A switch 19 that is turned on and off according to a reset signal RS_S is provided between the coupling capacitor 18 and the switch unit 41. A charge signal generated by the light receiving element is converted into a voltage signal by the source follower amplifier 17. The voltage signal is converted into a charge signal through the coupling capacitor 18. In FIG. 28, PD1, PD2, PD3, and PD4 are shown as outputs from the pixel portions 11. The imaging device 1 according to the fourth modification example operates according to the timing charts shown in FIGS. 29 and 30. According to the fourth modification example as well, as in the third modification example described above, it is possible to realize an efficient TDI operation while suppressing an increase in circuit size and reducing the amount of output signal.

The present disclosure is not limited to the embodiment and its modification examples described above. For example, the pixel portion 11 may perform photoelectric conversion, and may detect not only visible light but also infrared rays or X-rays. In the embodiment described above, the A/D converter 61 is not limited to the single slope type. The A/D converter 61 may convert the input voltage signal into a digital value and sequentially add the digital value. In the embodiment described above, the switch array 40 may be connected between the comparator 62 and the counter 63 of the A/D converter 61. Even in this case, the connection states between the charge amplifiers CA1 to CA4 and the capacitors 65 of the A/D converters AD1 to AD4 can be switched by the switch array 40.

In the embodiment described above, the count value obtained by counting according to the signals for four frames is read as a digital value. However, by changing the timings of the reset signals RS_C1 to RS_C4 input to the counters 63 of the A/D converters AD1 to AD4 and the read signals D1 to D4 from the decoder 4, the number of frames to be added can be changed. In the third and fourth modification examples as well, the pixel unit 2, the circuit section 3, and the decoder 4 may be formed on separate chips as in the first modification example.

REFERENCE SIGNS LIST

1: imaging device,
2: pixel unit,
5: circuit unit,
11, PD1 to PD4: pixel portion,
12: pixel array,
31, CA1 to CA4: charge amplifier,
32: operational amplifier,
32*a*: inverting input terminal,
32*c*: output terminal,
33: capacitive portion,
40, 40A: switch array (switch circuit),
61, AD1 to AD4: A/D converter,
62: comparator (addition processing portion),
63: counter (addition processing portion),
65: capacitor (holding portion),
X1: first direction,
X2: second direction.

The invention claimed is:

1. An imaging device, comprising:

a pixel unit having M (M is an integer of 2 or more) pixel arrays arranged along a second direction perpendicular to a first direction, wherein each of the M pixel arrays includes N (N is an integer of 2 or more) pixel portions that perform photoelectric conversion and are arranged along the first direction; and M circuit units provided corresponding to the M pixel arrays, wherein each of the M circuit units includes:

N charge amplifiers each of which includes an operational amplifier and a capacitive portion connected between an inverting input terminal and an output terminal of the operational amplifier and which convert charge signals output from the N pixel portions of the corresponding pixel array into voltage signals;

N A/D converters each including an addition processing portion for performing addition processing on the voltage signals output from any one of the N charge amplifiers and a holding portion for holding an addition signal corresponding to an addition state of the addition processing portion; and a switch circuit for switching connection states between the N charge amplifiers and the holding portions of the N A/D converters, and in each of the M circuit units, the switch circuit switches the connection state so that the holding portion for holding the addition signal corresponding to the charge signal output from the pixel portion is switched in accordance with an arrangement order of the N pixel portions along the first direction.

2. The imaging device according to claim 1, wherein each of the N A/D converters is of a single slope type.

3. The imaging device according to claim 1, wherein the switch circuit is connected between the N charge amplifiers and the addition processing portions of the A/D converters.

4. The imaging device according to claim 1, wherein the M circuit units are arranged so as to be adjacent to the corresponding pixel arrays in the first direction, each of the M circuit units includes N arrangement regions aligned in the second direction, and the charge amplifier and the A/D converter are arranged in each of the N arrangement regions, and a width of each of the N arrangement regions in the second direction is equal to or less than 1/N of a width of the pixel portion in the second direction.

5. The imaging device according to claim 1, wherein each of the N pixel portions includes a surface type photodiode.

6. The imaging device according to claim 1, wherein each of the N pixel portions includes an embedded photodiode.

7. The imaging device according to claim 1, wherein N is an integer of 8 or more.

8. An imaging device, comprising:

a pixel unit having M (M is an integer of 2 or more) pixel arrays arranged along a second direction perpendicular to a first direction, wherein each of the M pixel arrays includes N (N is an integer of 2 or more) pixel portions that perform photoelectric conversion and are arranged along the first direction; and M circuit units provided corresponding to the M pixel arrays, wherein each of the M circuit units includes:

N charge amplifiers each of which includes an operational amplifier and a capacitive portion, which is connected between an inverting input terminal and an output terminal of the operational amplifier and in which a charge signal output from any one of the N pixel portions of the corresponding pixel array is accumulated, and which convert the charge signal into a voltage signal; and a switch circuit for switching connection states between the N pixel portions and the capacitive portions of the N charge amplifiers, and in each of the M circuit units, the switch circuit switches the connection state so that the capacitive portion in which the charge signal output from the pixel portion is accumulated is switched in accordance with an arrangement order of the N pixel portions along the first direction, wherein the M circuit units are arranged so as to be adjacent to the corresponding pixel arrays in the first direction, each of the M circuit units has N arrangement regions aligned in the second direction, and the charge amplifier is arranged in each of the N arrangement regions, and a width of each of the N arrangement regions in the second direction is equal to or less than 1/N of a width of the pixel portion in the second direction.

9. An imaging device, comprising:

a pixel unit having M (M is an integer of 2 or more) pixel arrays arranged along a second direction perpendicular to a first direction, wherein each of the M pixel arrays includes N (Nis an integer of 2 or more) pixel portions that perform photoelectric conversion and are arranged along the first direction; and M circuit units provided corresponding to the M pixel arrays, wherein each of the M circuit units includes:

N charge amplifiers each of which includes an operational amplifier and a capacitive portion, which is connected between an inverting input terminal and an output terminal of the operational amplifier and in which a charge signal output from any one of the N pixel portions of the corresponding pixel array is accumulated, and which convert the charge signal into a voltage signal; and a switch circuit for switching connection states between the N pixel portions and the capacitive portions of the N charge amplifiers, wherein the switch circuit includes N×N switches configured such that each of the N pixel portions is selectively connectable to each of the capacitive portions of the N charge amplifiers, and in each of the M circuit units, the switch circuit switches the connection state so that the capacitive portion in which the charge signal output from the pixel portion is accumulated is switched in accordance with an arrangement order of the N pixel portions along the first direction.

* * * * *